US008527732B2

(12) United States Patent
Tatara

(10) Patent No.: US 8,527,732 B2
(45) Date of Patent: Sep. 3, 2013

(54) STORAGE SYSTEM AND METHOD OF CONTROLLING STORAGE SYSTEM

(75) Inventor: Kohei Tatara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 159 days.

(21) Appl. No.: 13/262,997

(22) PCT Filed: Sep. 16, 2011

(86) PCT No.: PCT/JP2011/005265
§ 371 (c)(1),
(2), (4) Date: Oct. 5, 2011

(87) PCT Pub. No.: WO2013/038465
PCT Pub. Date: Mar. 21, 2013

(65) Prior Publication Data
US 2013/0073826 A1    Mar. 21, 2013

(51) Int. Cl.
*G06F 13/00*     (2006.01)

(52) U.S. Cl.
USPC .......................... 711/173; 711/154; 711/203

(58) Field of Classification Search
USPC .......................... 711/154, 173, 203
See application file for complete search history.

(56) References Cited

U.S. PATENT DOCUMENTS

| 5,497,472 | A | 3/1996 | Yamamoto et al. | |
|---|---|---|---|---|
| 7,613,896 | B2 | 11/2009 | Yamamoto et al. | |
| 2008/0229118 | A1* | 9/2008 | Kasako et al. | 713/193 |
| 2009/0187730 | A1* | 7/2009 | Mori et al. | 711/207 |

OTHER PUBLICATIONS

Rick Ripberger, et al., "IBM DS8000 Storage Allocation Overview Including Thin Provisioning," Enterprise Disk Architecture, Dept CSVA/9032-1, IBM Tucson, Version 1.0, Sep. 8, 2009; pp. 1-39; Retrieved from the Internet: URL:http://www.thebrainhouse.ch/gse/doku/71_GSE/Silvios_Jukebox/WP101550%20DS8000%20Storage%20Allocation%20Overview%20V1R0%20%2820090923%29.pdf retrieved Apr. 10, 2012.
PCT International Search Report and Written Opinion issued in PCT/JP2011/005265 mailed Apr. 26, 2012; 13 pages.
XP-002673688, Betrand Dufrasne et al., "DS8000 Thin Provisioning," ibm.com/redbooks, Oct. 2009, pp. 1-viii, 1-36, 101-106; Retrieved from the Internet: URL:http://www.redbooks.ibm.com/abstracts/redp4554.html?Open, retrieved Apr. 10, 2012.
Rick Ripberger, et al., "IBM DS8000 Storage Allocation Overview Including Thin Provisioning," Enterprise Disk Architecture, Dept CSVA/9032-1, IBM Tuscon, Version 1.0, Sep. 8, 2009; pp. 1-39; Retrieved from the Internet: URL:http://www.thebrainhouse.ch/gse/doku/71_GSE/Silvios_Jukebox/WP101550%20DS8000%20Storage%20Allocation%20Overview%20V1R0%20%2820090923%29.pdf retrieved Apr. 10, 2012.

* cited by examiner

*Primary Examiner* — Reba I Elmore
(74) *Attorney, Agent, or Firm* — Foley & Lardner LLP

(57) ABSTRACT

A storage system in an embodiment of this invention comprises a virtual volume to which real storage areas are allocated depending on data amount to be stored therein and which stores a plurality of mainframe data managed in units of tracks, each of the plurality of mainframe data including control information and one or more records storing user data, and a controller The virtual volume is managed by a first real storage area storing the records in the plurality of mainframe data and a second real storage area storing the control information in the plurality of mainframe data. The controller determines not to allocate the first real storage area to the virtual volume in a case that user data in the records in the plurality of mainframe data are initial values. The control information in the plurality of mainframe data is stored in the second real storage area allocated to the virtual volume.

15 Claims, 17 Drawing Sheets

| RELATIONSHIPS BETWEEN HDEV NOS. AND VOLUME SIZES ||
| 601 | 602 |
| HDEV NO. | VOLUME SIZE |
| 1 | 2TB |
| 2 | 1TB |
| 3 | 4TB |
| ... | ... |

| RELATIONSHIPS BETWEEN HDEV NOS. AND HDEVS' ATTRIBUTES ||
| 701 | 702 |
| HDEV NO. | VOLUME ATTRIBUTE |
| 1 | NORMAL VOLUME |
| 2 | VIRTUAL VOLUME |
| 3 | VIRTUAL VOLUME |
| ... | ... |

| RELATIONSHIPS BETWEEN LDEV NOS. AND DISK NOS. ||
| 801 | 802 |
| LDEV NO. | DISK NO. |
| 1 | 1 |
|   | 2 |
| ... |   |

Fig. 9

RELATIONSHIPS BETWEEN LDEV NOS. AND POOL NOS. (405)

| LDEV NO. (901) | POOL NO. (902) |
|---|---|
| 2 | 1 |
| 3 | 2 |
| ... | ... |

Fig. 10

RELATIONSHIPS BETWEEN POOL NOS. AND DISK NOS. (406)

| POOL NO. (1001) | DISK NO. (1002) |
|---|---|
| 1 | 1 |
|  | 2 |
| 2 | 3 |
|  | 4 |
| ... | ... |

Fig. 11

PAGE MAPPING TABLE (PMT) 407

| IN-LDEV PAGE NO. 1101 | IN-LDEV BEGINNING ADDRESS OF PAGE 1102 | DISK NO. 1103 | IN-DISK BEGINNING ADDRESS OF PAGE 1104 | PAGE ALLOCATION DETERMINATION INFORMATION 1105 |
|---|---|---|---|---|
| 1 | 0x00000000 | 1 | 0x00000100 | ALLOCATED |
| 2 | 0x00000100 | 2 | 0x00000200 | UNALLOCATED |
| 3 | 0x00000200 | 3 | 0x00000300 | ALLOCATED |
| 4 | 0x00000300 | 1 | 0x00000400 | ALLOCATED |
| 5 | 0x00000400 | 2 | 0x00000500 | UNALLOCATED |
| ... | ... | ... | ... | ... |

Fig. 12

PMT MANAGEMENT DIRECTORY 408

| LDEV NO. 1201 | ADDRESS OF PAGE MAPPING TABLE 1202 |
|---|---|
| 1 | 0xC0000000 |
| 2 | 0xC0001000 |
| ... | ... |

| USER DATA AREA 1302 | USER DATA SECTION OF TRACK 1 | 321 |
| | USER DATA SECTION OF TRACK 2 | 321 |
| | ... | |
| CONTROL INFORMATION AREA 1303 | CONTROL INFORMATION SECTION OF TRACK 1 | 322 |
| | CONTROL INFORMATION SECTION OF TRACK 2 | 322 |
| | ... | |

| 1402 | EQUAL-LENGTH BIT MAP 1403 |
|---|---|
| TRACK NO. | EQUAL-LENGTH BIT STRING |
| 0 | b'01 |
| 1 | b'01 |
| 2 | b'01 |
| 3 | b'00 |
| ... | ... |

| DEFINITION OF EQUAL-LENGTH BIT STRING WITH RECORD LENGTH AND NUMBER OF RECORDS | | |
|---|---|---|
| 1502 | 1503 | 1504 |
| BIT TYPE | RECORD LENGTH | NUMBER OF RECORDS |
| b'00 | VARIABLE-LENGTH RECORD | ARBITRARY (MAXIMUM NUMBER FOR TRACK) |
| b'01 | 4KB | 14 |
| b'10 | 8KB | 7 |
| ... | | ... |

STORAGE SYSTEM AND METHOD OF CONTROLLING STORAGE SYSTEM

TECHNICAL FIELD

This invention relates to a storage system and a method of controlling a storage system, and further relates to a dynamic allocation method of real storage areas to a virtual volume.

BACKGROUND ART

In the system disclosed in Patent Literature 1, a volume is composed of one or more tracks. In a real storage apparatus, each track includes a home address and Record 0 at the beginning of the track and records (Record 1, Record 2 . . . ) for storing user data subsequent to the Record 0. An MF (Main Frame) host defines a dataset in a VTOC (Volume Table of Contents) and creates records in a track to be allocated for the dataset.

The MF host writes user data to the records in the track to update the records. If the records created in the track have equal lengths, a storage system calculates write positions in the records and carries out a cache write.

In the storage system disclosed in Patent Literature 2 manages virtual volumes composed of virtual storage areas and allocates a real storage area to a virtual volume in response to a host write. When an MF host defines a dataset in a virtual volume, a storage system allocates a real storage area to the virtual volume through the above-described record creation.

CITATION LIST

Patent Literature

PTL 1: U.S. Pat. No. 5,497,472 A
PTL 2: U.S. Pat. No. 7,613,896 B2

SUMMARY OF INVENTION

Technical Problem

In a traditional technique, when an MF host defines a dataset in a VTOC, it creates records in a track to store the dataset (formatting) as described above. Specifically, a storage system creates records in the track for the dataset in response to a format write command from the MF host. A record consists of a field for storing control data of the record and a field for storing user data.

In a formatting, control data of the record is written to a real storage area and nothing is written (an initial value is kept) or an initial value is written to the field for storing user data. In operation, an MF host writes user data to the data field (the field for storing user data) of a record preliminarily created by the formatting to update the record.

For that purpose, when an MF host creates a VTOC for a virtual volume, a storage system allocates a real storage area to the virtual volume to create records in the virtual volume. The storage system creates records in the allocated real storage area. Although the records created by formatting do not contain user data from the MF host, a real storage area having the size of the defined dataset is allocated to the virtual volume. Consequently, the merit of a virtual volume that varies the capacity of the real storage area depending on the amount of user data to be stored is spoiled.

Solution to Problem

In order to solve the above problems, for example, a configuration described in CLAIMS is utilized. The present invention includes aspects to solve the above problems and an aspect is a storage system comprising a virtual volume to which real storage areas are allocated depending on data amount to be stored therein and which stores a plurality of mainframe data managed in units of tracks, each of the plurality of mainframe data including control information and one or more records storing user data, and a controller. The virtual volume is managed by a first real storage area storing the records in the plurality of mainframe data and a second real storage area storing the control information in the plurality of mainframe data. The controller determines not to allocate the first real storage area to the virtual volume in a case that user data in the records in the plurality of mainframe data are initial values. The control information in the plurality of mainframe data is stored in the second real storage area allocated to the virtual volume.

Advantageous Effects of Invention

In a storage system that stores user data in units of records each including a control data field and a user data field, this invention can save a real storage area allocated to a virtual volume. Problems to be solved, configurations, and advantageous effects of this invention other than those described above will be made apparent through the explanations in the preferred embodiments described below.

BRIEF DESCRIPTION OF DRAWINGS

FIG. 6 is a drawing illustrating a configuration of a management table for managing relationships between HDEV numbers and volume sizes in the first embodiment.

FIG. 7 is a drawing illustrating a configuration of a management table for managing relationships between HDEV numbers and HDEVs' attributes in the first embodiment.

FIG. 8 is a drawing illustrating a configuration of a management table for managing relationships between LDEV numbers and disk numbers in the first embodiment.

FIG. 9 is a drawing illustrating a configuration of a management table for managing relationships between LDEV numbers and pool numbers in the first embodiment.

FIG. 10 is a drawing illustrating a configuration of a management table for managing relationships between pool numbers and disk numbers in the first embodiment.

FIG. 11 is a drawing illustrating a configuration of a PMT (Page Mapping Table) used in page allocation in the first embodiment.

FIG. 12 is a drawing illustrating a configuration of a PMT management directory in the first embodiment.

FIG. 13 is a drawing for illustrating data arrangement in an LDEV in the first embodiment.

FIG. 14 is a drawing illustrating a configuration of an equal-length bit map indicating relationships between track numbers and record lengths in the tracks.

FIG. 15 is a drawing illustrating a configuration of a management table for managing the definition of equal-length bit string with the record length and the number of records in the first embodiment.

DESCRIPTION OF EMBODIMENTS

Hereinafter, preferred embodiments of this invention will be described with reference to the accompanying drawings. For clarity of explanation, the following descriptions and the accompanying drawings contain omissions and simplifications as appropriate. This invention is not limited to the embodiments and the technical scope of this invention includes any applications that meet the idea of this invention. Unless specifically limited, the number of each constituent may be plural or singular.

First Embodiment

A storage system in this embodiment manages virtual volumes composed of virtual storage areas and dynamically allocates real storage areas (hereinafter, pages) from a pool to a virtual storage area. The host computer defines a dataset for a virtual volume and performs a format write to create records in the virtual volume. The volume stores user data in units of records; each record consists of a control data field for storing control data and a user data field (hereinafter, data fields) for storing user data.

In the format write, the storage system in this embodiment determines not to allocate a page in which all of the records to be stored (the number of such records may be smaller than the number of records the page can store) contain initial values in their data fields to a virtual volume.

In this embodiment, the storage system dynamically allocates a page to a virtual volume, creates records in the page, and then determines whether to allocate the page or not. Records to be stored are records which have already been stored in a page; the storage system refers to the created records in the page and deallocates the page upon determination not to allocate the page.

The storage system keeps the page unallocated until it receives an update write request from a host computer. Through this configuration, the storage system can omit to allocate a page which does not contain user data sent from the host computer to save the real storage capacity allocated to the virtual volume.

Figure 1:
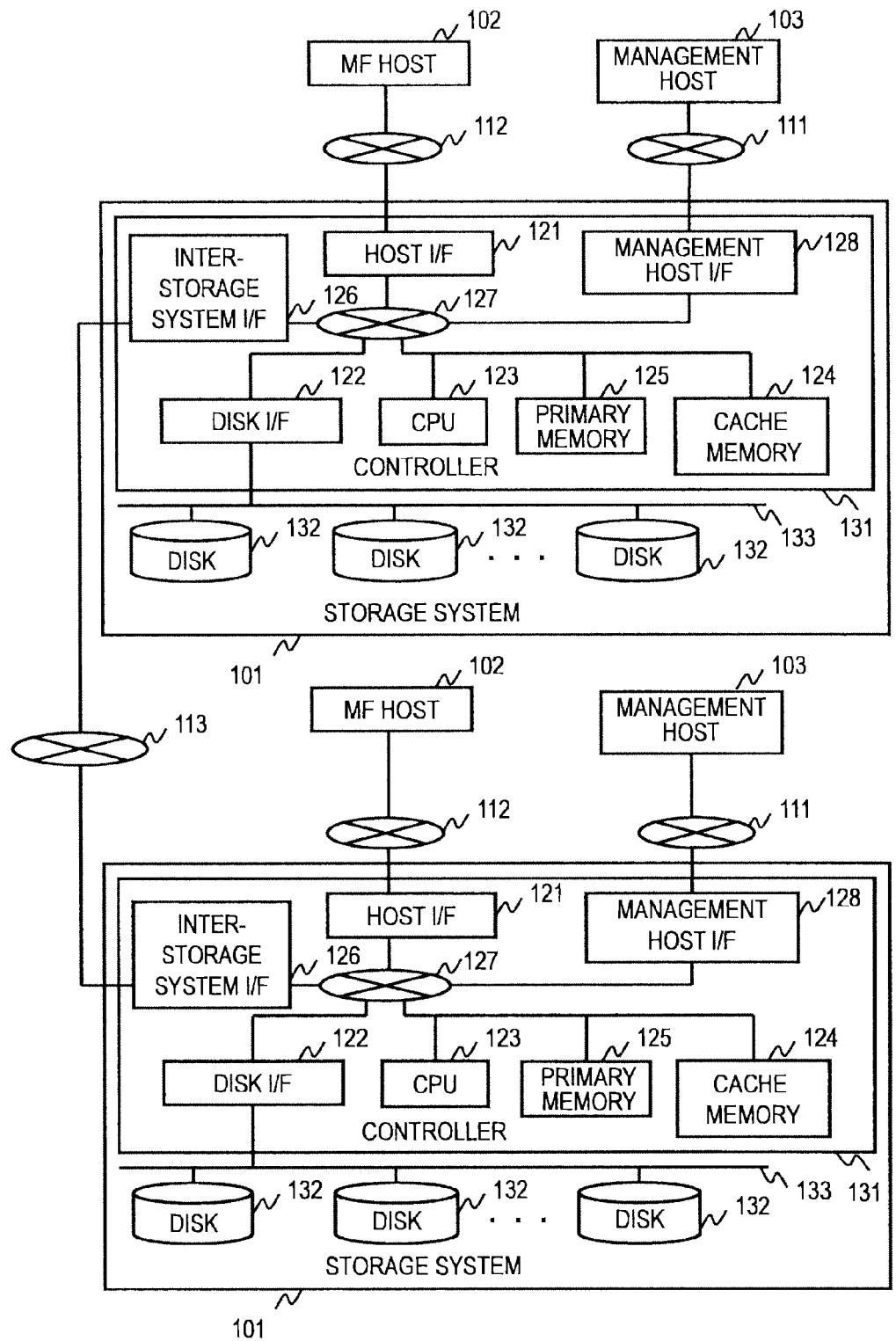
FIG. 1 is a block diagram illustrating an overall configuration of a computer system in the first embodiment.

FIG. 1 illustrates an overall configuration of a computer system in this embodiment. In FIG. 1, the computer system includes a plurality of storage systems 101, a plurality of MF (Main Frame) host computers 102 and management host computers 103. FIG. 1 exemplifies two storage systems 101, two MF host computers 102, and two management host computers 103.

A storage system 101 is connected to an MF host computer 102 via a network 112. The storage system 101 is also connected to a management host computer 103 via a network 111. The two storage systems 101 are connected to each other via a network 113. Although not shown in FIG. 1, the MF host computer 102 is connected to the management host computer 103 via the network 111.

Typically, the apparatuses are connected to the networks with cables such as metal cables or optical fiber cables; however, the MF host computer 102 and the storage system 101, the storage system 101 and the management host computer 103, or the MF host computer 102 and the management host computer 103 can be wirelessly connected to each other.

The network 112 is a data network, such as a SAN (Storage Area Network). The network 112 may be an IP network or any other kind of network for data communication. The network 111 is a management network, such as an IP network. The network 111 may be a SAN or any other kind of network. The networks 111 and 112 may be the same network.

Next, a configuration of the storage system 101 is described. The storage system 101 includes, for example, one or more storage controllers 131 and one or more disk devices (hereinafter, disks) 132.

As a disk 132 of a storage device for storing data, an SSD (Solid State Drive), a SAS (Serial Attached SCSI)-HDD (Hard Disk Drive), or a SATA (Serial Advanced Technology Attachment)-HDD may be used. Instead of at least one of the plurality of disks 132 or in addition to the disks 132, any other kind of physical storage device may be used.

The one or more disks 132 are connected to the storage controller 131 via a communication path 133 made of, for example, a fiber channel cable. It should be noted that the plurality of disks 132 can configure one or more RAID (Redundant Array of Independent Disks) groups.

Next, a configuration of the storage controller 131 is described. The storage controller 131 controls inputs and outputs, namely, writes and reads, of data to and from the disks 132, as per commands received from the MF host computer 102.

The storage controller 131 provides the MF host computer 102 of an access request source with a logical device to which real storage areas have been allocated or a logical device composed of virtual storage areas used by a later-described thin provisioning function for a logical device or logical volume of an access target. In this description, logical volumes are the same as the logical devices.

Whether a part or all of the real storage areas have been allocated or not to a virtual volume which changes the capacity of the real storage areas depending on the amount of user data (hereinafter, also referred as a logical device with virtual volume attributes) may be satisfactory. The storage controller 131 can distinguish real storage areas from virtual storage areas, for example, by referring to cylinder head numbers (hereinafter, track numbers).

The storage controller 131 includes storage resources, communication interface devices (hereinafter, abbreviated as I/Fs), and a processor connected to them. The processor may be a CPU (Central Processing Unit) 123. The storage resources may be a CM (Cache Memory) 124 and a primary memory 125. The storage controller 131 may include a separate non-volatile memory as one of the storage resources.

For the communication I/Fs, a host I/F 121 for receiving read commands and write commands from the MF host computer 102 and sending and receiving user data to and from the MF host computer 102, a management host I/F 128 for receiving instructions (for example, a local copy command) from the management host computer 103, a disk I/F 122 for sending and receiving data to and from the disks 132, and an inter-storage system I/F 126 for sending and receiving data between the storage systems 101 are provided.

The CM 124, the CPU 123, the host I/F 121, the management host I/F 128, and the disk I/F 122 are interconnected via a network 127 for changing communication lines such as buses and communications. The hardware configuration of the MF host computers 102 and the management computers 103 are the same as that of a commonly used computer.

In other words, the MF host computers 102 and the management host computers 103 each include communication interface devices, storage resources, and a processor connected to them. The communication interface devices may be an HBA (Host Bus Adapter) for communication via the network 112 and a management host I/F for communication via the network 111. The storage resources are configured with semiconductor memories or HDDs, for example.

Figure 2:
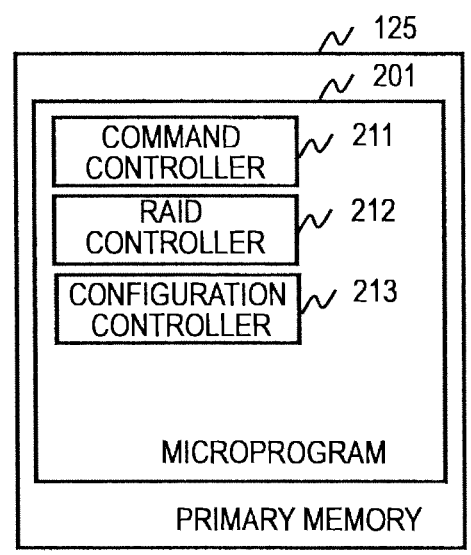
FIG. 2 is a block diagram illustrating a configuration of a microprogram executed in a storage controller in the first embodiment.

FIG. 2 illustrates a configuration of a microprogram 201 to be executed in the storage controller 131. In FIG. 2, one or more microprograms 201 are loaded by the CPU 123 from a disk 132 or a non-volatile storage memory in the storage controller 131 to the primary memory 125.

The microprogram 201 includes a command controller 211, a RAID controller 212, and a configuration controller 213. These are program modules of the microprogram 201. The CPU 123 executes the controllers 211 to 213 in the microprogram 201 loaded to the primary memory 125 to perform various processing, which will be described later.

The CPU (processor) 123 operates in accordance with a program to function as operation parts to implement predetermined functions. For example, the CPU 123 operates in accordance with the microprogram 201 to function as the command controller, the RAID controller, and the configuration controller. The storage system 101 is a system including these operation parts.

In this way, a program is executed by a processor to perform predetermined processing while using storage devices and communication ports (communication devices). Accordingly, the explanations in this embodiment or other embodiments having the subjects of "program" may be replaced with those having the subjects of "processor (CPU)". The processing executed by a program is processing performed by the apparatus or the system on which the program is running.

The CM 124 functions as a buffer for temporarily storing write data (user data) received by the MF host computer 102 or user data read from a disk 132 by the RAID controller 212 in the microprogram 201.

The host I/F 121 connects to the MF host computer 102 via the network 112; it receives an access command (a write command or a read command) as an access request from the MF host computer 102 and transfers the received access command to the command controller 211.

The management host I/F 128 connects to the management host computer 103 via the network 111; for example, upon receipt of a later-described volume-to-volume data copy instruction from the management host computer 103, it transfers the received instruction to the command controller 211. The disk I/F 122 transmits and receives data between the disks 132 and the storage resources (the primary memory 125 and the CM 124) in the storage controller 131. The disk I/F 122 is connected to the individual disks 132 via a communication path 133.

Next, basic operations of a storage system 101 are described. Upon receipt of a write command from an MF host computer 102 via the host interface I/F 121, the storage controller 131 stores write data received from the MF host computer 102 in the CM 124.

The storage controller 131 writes the write data stored in the CM 124 to a disk 132 through the disk I/F 122. The storage controller 131 may be configured to notify the MF host computer 102 of the completion of the write command processing when the write data have been stored in the CM 124 or may be configured to notify the MF host computer 102 of the completion of the write command processing when the write data have been written to the disk 132.

Upon receipt of a read command from an MF host computer 102, the storage controller 131 checks whether the data (read target data) designated by the read command with parameters is held in the CM 124.

If the CM 124 holds the read target data, the storage controller 131 retrieves the read target data from the CM 124 and transmits the retrieved read target data to the MF host computer 102 via the host I/F 121.

On the other hand, if the CM 124 does not hold the read target data, the storage controller 131 retrieves the read target data from the one or more disks 132 via the disk I/F 122 and stores the retrieved read target data in the CM 124. Thereafter, the storage controller 131 transmits the read target data held in the CM 124 to the MF host computer 102 via the host I/F 121.

Figure 3:
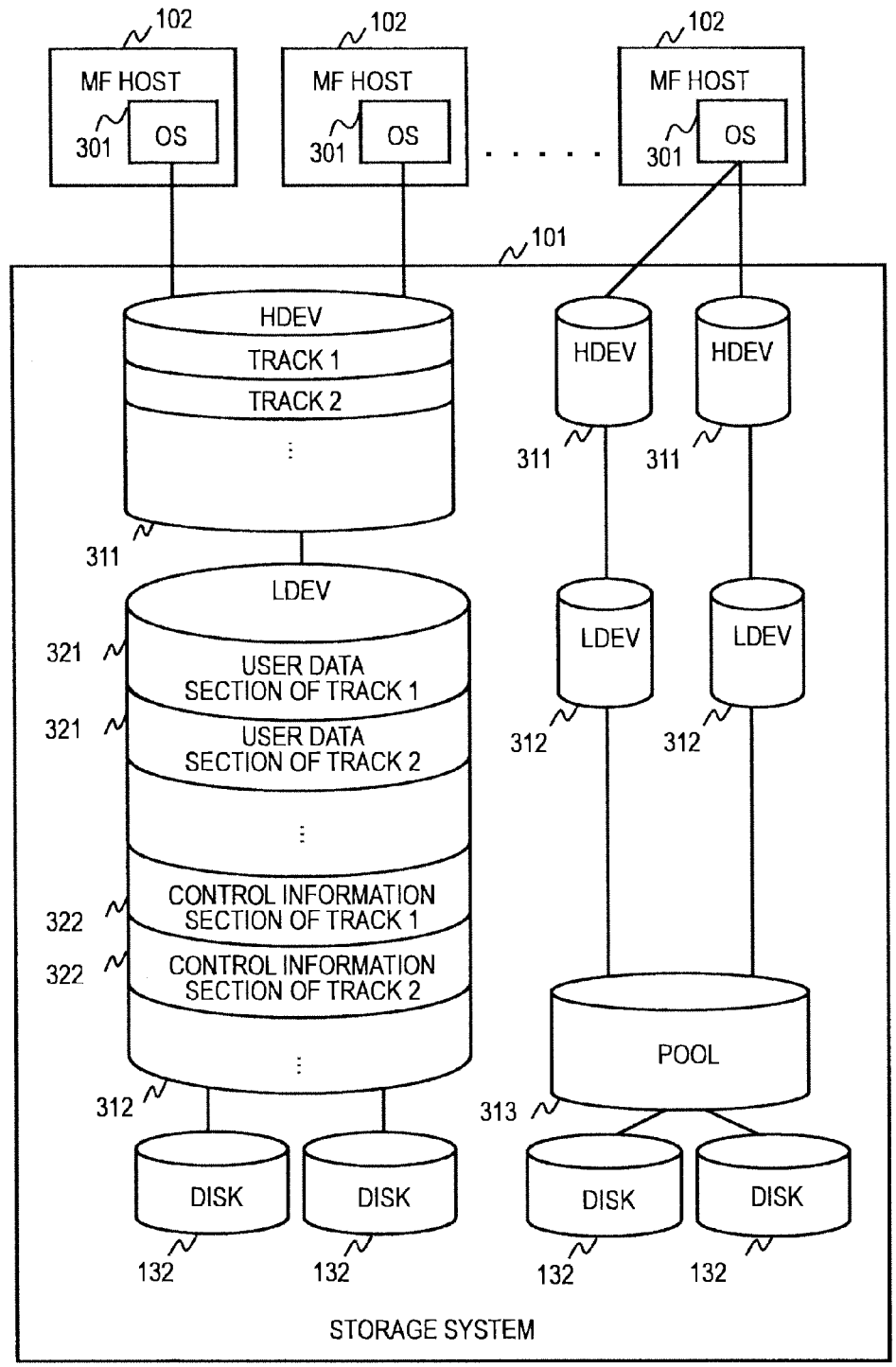
FIG. 3 is a block diagram illustrating a logical configuration in a storage system in the first embodiment.

FIG. 3 schematically illustrates a logical configuration of a storage system. In FIG. 3, the storage system 101 is accessed by MF host computers 102 and a management host computer 103. It includes one or more logical devices for the hosts (hereinafter, may be referred to as HDEVs or host volumes) 311.

The HDEVs 311 have HDEV numbers uniquely assigned in the storage system 101; the MF host computers 102 and the management host computer 103 can identify the HDEVs 311 with the HDEV numbers. For example, an OS 301 in each MF host computer 102 performs a read access or a write access to the HDEVs 311.

An HDEV 311 is composed of, for example, a group of tracks (track 1, track 2 . . . ); cylinder head numbers (track numbers) assigned to the tracks are referred to by the MF host computers 102 and the management host computer 103 to identify the tracks. One or more logical devices (hereinafter, may be referred to as LDEVs or logical volumes) 312 are associated with an HDEV 311.

The LDEVs 312 have LDEV numbers uniquely assigned in the storage system 101; the microprogram 201 identifies the LDEVs 312 with the LDEV numbers. An LDEV 312 may be composed of storage areas of one or more disks 132. The LDEV 312 may also be composed of storage areas of a plurality of RAID groups.

An LDEV 312 includes a plurality of data sections (user data storage areas) 321 and a plurality of control information sections (control information storage areas) 322 corresponding to tracks. Each user data section 321 is composed of one or more records (not shown) contained in one track (track number).

In this example, a track consists of a home address and a plurality of records. The first record is Record 0, which stores control information on the track, like the home address does.

The track can be identified with the home address and the Record 0. The other Records K (K is a natural number except for 0) store user data.

Each record for storing user data consists of a count field (control data field) for storing control data of the record and a data field for storing user data (not shown). The count field stores a track number, a record number, and information on the locations and the sizes of the count field and the data field.

The data field stores user data written to the record by an MF host computer 102. Before storing user data written by the MF host computer 102, the data field holds an initial value. The count field can have information (an initial value flag) for indicating whether the data field contains an initial value. When the initial value flag is OFF (for example, "0"), the data field contains an initial value, for example, a zero value and when the initial value flag is ON (for example, "1"), the data field contains a value other than the initial value, for example, a non-zero value.

The field (the count field in this example) for storing control data of the record may be in any data format. For example, the field for storing control data can include keys for search. The data field also may have any data format.

Each control information section 322 holds control information to access the user data section 321 (Record 1, Record 2 . . . ) of the associated track, or control information to refer to or update the user data section 321 of the associated track. For example, the control information section 322 includes the home address and Record 0 of the associated track.

In this example, all of the tracks in a storage system 101 have the same size. In the storage system 101, all of the data sections 321 have the same size and all of the control information sections 322 have the same size. This invention can be applied to a storage system in which they have different sizes.

The disks 132 have disk numbers unique in the storage system 101; the microprogram 201 identifies the disks 132 with the disk numbers. An LDEV 312 may be a logical device (logical volume) composed of real storage areas or a logical device (virtual volume) with virtual volume attributes used in a later-described thin provisioning function. The capacity of real storage areas allocated to a logical volume does not change. On the other hand, the capacity of real storage areas allocated to a virtual volume changes according to the amount of user data to be stored.

A virtual volume is virtualized in its capacity, which means the real capacity of the virtual volume is equal to or smaller than the capacity of the associated HDEV recognized by MF host computers 102. In response to a data write to the virtual volume, the storage system 101 allocates a real storage area (page) to the virtual volume from a pool 313. Details of the allocation of a real storage area to a virtual volume will be described later.

A virtual volume is associated with a pool 313 which provides the virtual volume with real storage areas. Pools 313 have pool numbers uniquely assigned in the storage system 101 and the microprogram 201 identifies the pools 313 with the pool numbers. A pool 313 includes real storage areas of one or more disks 132.

A pool 313 may be composed of storage areas of one or more RAID groups. The one or more disks 132 may be inside of the storage system 101 or outside thereof. In the case where the disks are outside of the storage system 101, the storage system 101 that manages the pool 313 and the storage system in which the disks 132 providing the pool 313 with real storage areas are installed constitute a single storage system.

Figures 4, 5:
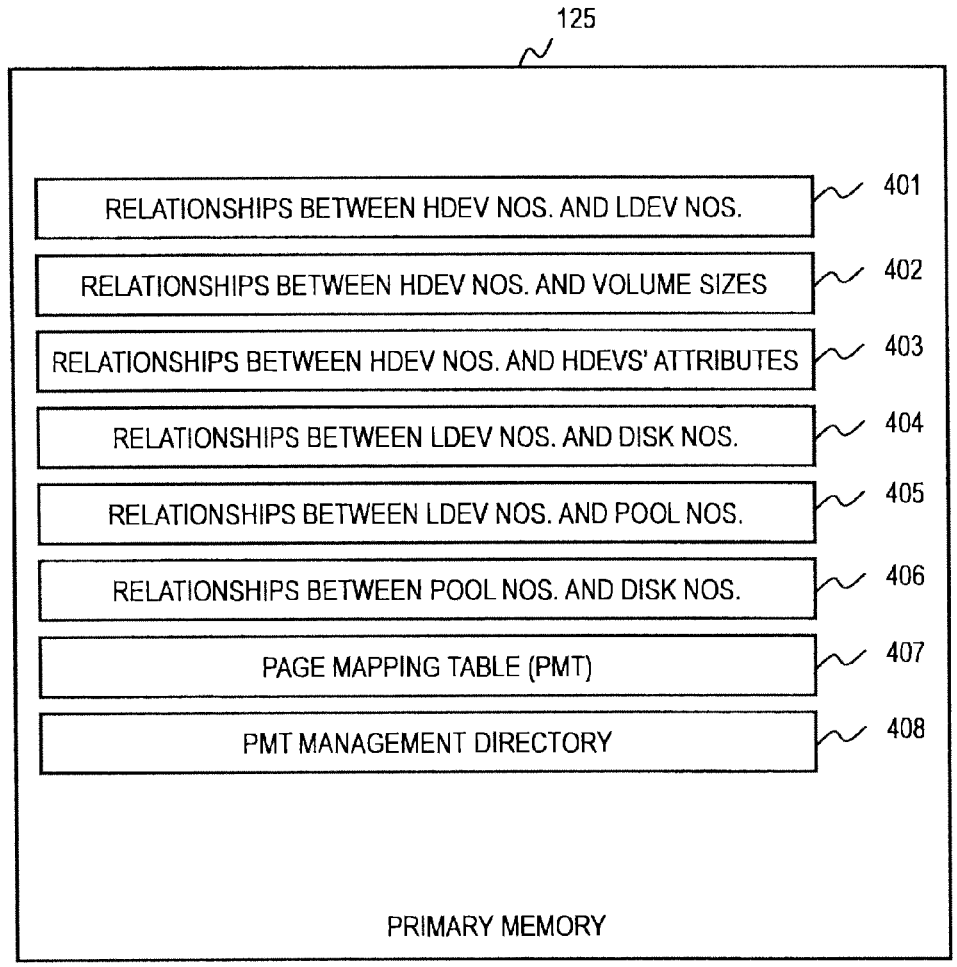
FIG. 4 is a block diagram illustrating management tables stored in a primary memory in the first embodiment.
FIG. 5 is a drawing illustrating a configuration of a management table for managing relationships between HDEV numbers and LDEV numbers in the first embodiment.

FIG. 4 illustrates management tables stored in the primary memory 125. The management tables 401 to 408 may be created at the start-up of the storage system 101 or may be created dynamically as necessary. The values in the management tables 401 to 408 are updated by the configuration controller 213 upon alteration of the logical configuration of the storage system 101.

FIG. 5 illustrates a configuration of a table 401 for managing the relationships between HDEV numbers and LDEV numbers in the case where an HDEV 311 is composed of a virtual volume. The management table 401 for managing the relationships between HDEV numbers and LDEV numbers is held in the primary memory 125.

The management table 401 includes an HDEV number column 501 and an LDEV number column 502. The HDEV numbers are numbers to uniquely identify the HDEVs 311 in the storage system 101; each field in the HDEV number column 501 stores a number associated with each HDEV 311. The LDEV numbers are numbers for uniquely identifying the LDEVs 312 in the storage system 101; each field in the LDEV number column 502 stores a number associated with each LDEV 312.

FIG. 6 illustrates a configuration of a table 402 for managing the relationships between HDEV numbers and volume sizes. The management table 402 includes an HDEV number column 601 and a volume size column 602. The HDEV numbers are numbers for uniquely identifying the HDEVs 311 in the storage system 101; each field in the HDEV number column 601 stores a number associated with each HDEV 311. Each field in the volume size column 602 stores a volume size associated with each HDEV 311.

The volume size is a maximum capacity for storing data in a normal volume or a virtual volume; each field in the volume size column 602 stores a capacity of each real volume or virtual volume in numeric value. The management table 402 for managing the relationships between HDEV numbers and volume sizes is stored in the primary memory 125.

FIG. 7 illustrates a configuration of a table 403 for managing the relationships between HDEV numbers and volume attributes. The table 403 for managing the relationships between HDEV numbers and volume attributes is stored in the primary memory 125.

The management table 403 includes an HDEV number column 701 and a volume attribute column 702. The HDEV numbers are numbers to uniquely identify the HDEVs 311 in the storage system 101; each field in the HDEV number column 701 stores a number associated with each HDEV 311.

A volume attribute specifies whether the volume attribute of an HDEV 311 is a normal volume which is not virtualized or a virtual volume; each field in the volume attribute column 702 stores a value indicating a normal volume or a virtual volume. If the volume attribute of an HDEV 311 is a normal volume, the HDEV 311 is a volume with a fixed real capacity and composed of real storage areas of one or more disks 132.

FIG. 8 illustrates a configuration of a table 404 for managing the relationships between LDEV numbers and disk numbers in the case where HDEVs 311 are composed of normal volumes. The table 404 for managing the relationships between LDEV numbers and disk numbers is stored in the primary memory 125.

The management table 404 includes an LDEV number column 801 and a disk number column 802. The LDEV numbers are numbers to uniquely identify the LDEVs 312 in the storage system 101; each field in the LDEV number column 801 stores a number associated with each LDEV 312. The disk numbers are numbers to uniquely identify the disks 132 in the storage system 101; each field in the disk number column 802 stores the number of the disk 132 that provides each LDEV 312 with real storage areas.

FIG. 9 illustrates a configuration of a table 405 for managing the relationships between LDEV numbers and pool numbers. The table 405 for managing the relationships between LDEV numbers and pool numbers is stored, for example, in the primary memory 125.

The management table 405 is a management table in the case where the volume attributes of LDEVs 312 are virtual volumes. The management table 405 includes an LDEV number column 901 and a pool number column 902. The LDEV numbers are numbers to uniquely identify the LDEVs 312 in the storage system 101; each field in the LDEV number column 901 stores a number associated with each LDEV 312.

The pool numbers are numbers to uniquely identify the pools 313 in the storage system 101; each field in the pool number column 902 stores the number of the pool 313 associated with each LDEV 312.

FIG. 10 illustrates a configuration of a management table 406 for managing the relationships between pool numbers and disk numbers. The table 406 for managing the relationships between pool numbers and disk numbers is stored in the primary memory 125. The management table 406 is a management table in the case where the volume attributes of HDEVs 311 are virtual volumes.

The management table 406 includes a pool number column 1001 and a disk number column 1002. The pool numbers are numbers to uniquely identify the pools 313 in the storage system 101; each field in the pool number column 1001 stores a number associated with each pool 313. The disk numbers are numbers to uniquely identify the disks 132 in the storage system 101; each field in the disk number column 1002 stores the number of a disk 132 which provides a pool 313 with real storage areas.

The following description is about a process that, in the case where a storage controller 131 manages an HDEV 311 as a virtual volume having virtual storage areas, the storage controller 131 allocates a real storage area (hereinafter, also referred to as a page) from a pool to the virtual volume in response to an access to the virtual volume. In this example, pages have the same size but may have different sizes.

The page allocation allocates real storage areas in units of pages to an LDEV with reference to the later-described PMT (Page Mapping Table) 407 and PMT management directory 408 in response to a request for page allocation to the LDEV, which will also be described later. Hereinafter, the function to perform processing related to page allocation to LDEVs is called thin provisioning function.

FIG. 11 is a configuration example of a PMT 407 to be used in the page allocation. As to FIG. 11, the PMT 407 is provided for each LDEV 312 and stored in the primary memory 125. The PMT 407 is a table to be used for page allocation to the LDEV and includes an in-LDEV page number column 1101, an in-LDEV beginning address of page column 1102, a disk number column 1103, an in-disk beginning address of page column 1104, and a page allocation determination information column 1105.

In FIG. 11, a set of a field of the in-LDEV page number column 1101 and the associated fields of the in-LDEV beginning address of page column 1102, the disk number column 1103, the in-disk beginning address of page column 1104, and the page allocation determination information column 1105 is called page entry.

Each field of the page number column 1101 stores the page number of each page allocated to the LDEV 312. Each field of the in-LDEV beginning address of page column 1102 stores the beginning address of each page allocated to the LDEV 312. Each field of the disk number column 1103 stores the number of a disk 132 providing a real storage area that constitutes each page in the LDEV 312.

Each field of the in-disk beginning address of page column 1104 stores the beginning address of a real storage area in a disk allocated to each page. Each field of the page allocation determination information column 1105 stores "allocated" if the page has been allocated to the LDEV 312 or "unallocated" if the page has not been allocated to the LDEV 312.

In other words, this page allocation determination information is used to manage the state of allocation of a real storage area to the LDEV by page. In an unallocated page, the in-disk beginning address of the page indicates, for example, the address of an initial value page. A plurality of initial value pages may be used. The initial value page will be explained later.

A page is a storage area having a certain size to be stored in a pool 313 and is a unit for separately managing the storage areas of an LDEV 312 with virtual volume attributes. For example, a page is a chunk of one or more tracks. The size of a page is 59392*672 bytes, for example. In this example, each track in a storage system 101 has the same size, for example, 59392 bytes.

FIG. 12 shows a configuration example of a PMT management directory 408. In FIG. 12, the PMT management directory 408 is a table for managing the relationships between LDEVs 312 and PMTs 407. The PMT management directory 408 includes an LDEV number column 1201 and an address of PMT column 1202 and is stored in, for example, the primary memory 125.

Each field in the LDEV number column 1201 stores the number of each LDEV 312. Each field of the PMT address column 1202 stores the address of the PMT 407 in the primary memory 125 for managing the pages of each LDEV 312.

FIG. 13 exemplifies a data arrangement in an LDEV 312 that is a constituent of an HDEV 311. In FIG. 13, the storage area 1301 of the LDEV 312 consists of a user data area 1302 and a control information area 1303.

The user data area 1302 is configured to be a data area for storing a plurality of data sections 321. Each user data section 321 includes one or more records associated with a track. The control information area 1303 is continuous from the user data area 1302 and is configured to be a control information area for storing control information sections 322 containing control information for accessing the individual data sections 321 stored in the user data area 1302.

The storage controller 131 manages the LDEV 312 in the form of a volume with a data arrangement in which the control information area 1303 is disposed subsequent to the user data area 1302 in the storage area 1301. The microprogram 201 identifies the data sections 321 and the control information sections 322 in the tracks with track numbers.

In an LDEV 312 in this form of a volume, the numbers of tracks in the user data area 1302 and the control information area 1303 increase with the number of tracks in the associated HDEV 311. In other words, increase in the number of tracks in an HDEV 311 because of expansion of its capacity increases the numbers of tracks in the user data area 1302 and the control information area 1303 in the associated LDEV 312 of this example. The data in the LDEV 312 may be arranged in such a manner that the control information data area 1303 precedes the user data area 1302.

FIG. 14 exemplifies a configuration of a table 1401 for managing equal-length bit map indicating relationships between track numbers and record lengths in the tracks. The management 1401 includes a track number column 1402 and an equal-length bit string column 1403. The management table 1401 may be held, for example, in the control information area 1303 in an LDEV 312, and further, may be cached in the primary memory 125.

The track numbers are numbers to uniquely identify tracks in the user data area 1302 in the LDEV 312. Each field in the track number column 1402 stores the number associated with each track in the user data area 1302. The equal-length bit strings are values indicating the conditions of records in the individual tracks; each field in the equal-length bit string column 1403 stores a value corresponding to a bit type in the management table 1502, which will be described next.

FIG. 15 exemplifies a management table 1501 for managing the definition of equal-length bit string with record length and the number of records; the table 1501 is stored in the primary memory 125. The management table 1501 includes a bit type column 1502, a record length column 1503, and a number of records column 1504.

The bit types are values to uniquely identify the definition of equal-length bit string indicted with the record length and the number of records in the management table 1501; each field of the bit type column 1502 stores a unique value for each definition of equal-length bit string. The record length is to indicate the length of records in a track; each field in the record length column 1503 stores the record length for each definition of equal-length bit string.

The number of records indicates the number of total records in a track; each field in the number of records column 1504 stores the number of total records in the track defined for each equal-length bit string. According to the definition of equal-length bit string with a record length and the number of records, the value of the bit type that indicates the records in the track do not have equal lengths is the initial value, which may be a zero value. In the following description, if the bit type of some track indicates a predetermined fixed length (4 KB or 8 KB in the example of FIG. 15), it is expressed that the equal-length bit string of the track is ON.

In this embodiment or other embodiments, information used by a system does not depend on data structure but may be expressed in any data structure. For example, a data structure appropriately selected from a table, a list, a database, and a queue can store the information. The information to be used by the system is stored in a storage area in a storage device. In the explanations on the information, expressions such as identification information, identifier, designation, name, and ID are used but these can be replaced with one another.

Hereinafter, a format write to an area for a dataset defined by a VTOC (Volume Table of Contents) is described. Operations of the command controller 211 to create records will be described with reference to FIGS. 16 and 17.

The command controller 211 creates records in response to a write access (hereinafter, format write) from an MF host computer 102 to create records in an HDEV 311 managed as an HDEV with virtual volume attributes. A format write command includes parameters for the HDEV number, record numbers, write data, and data size, for example.

Figure 16:
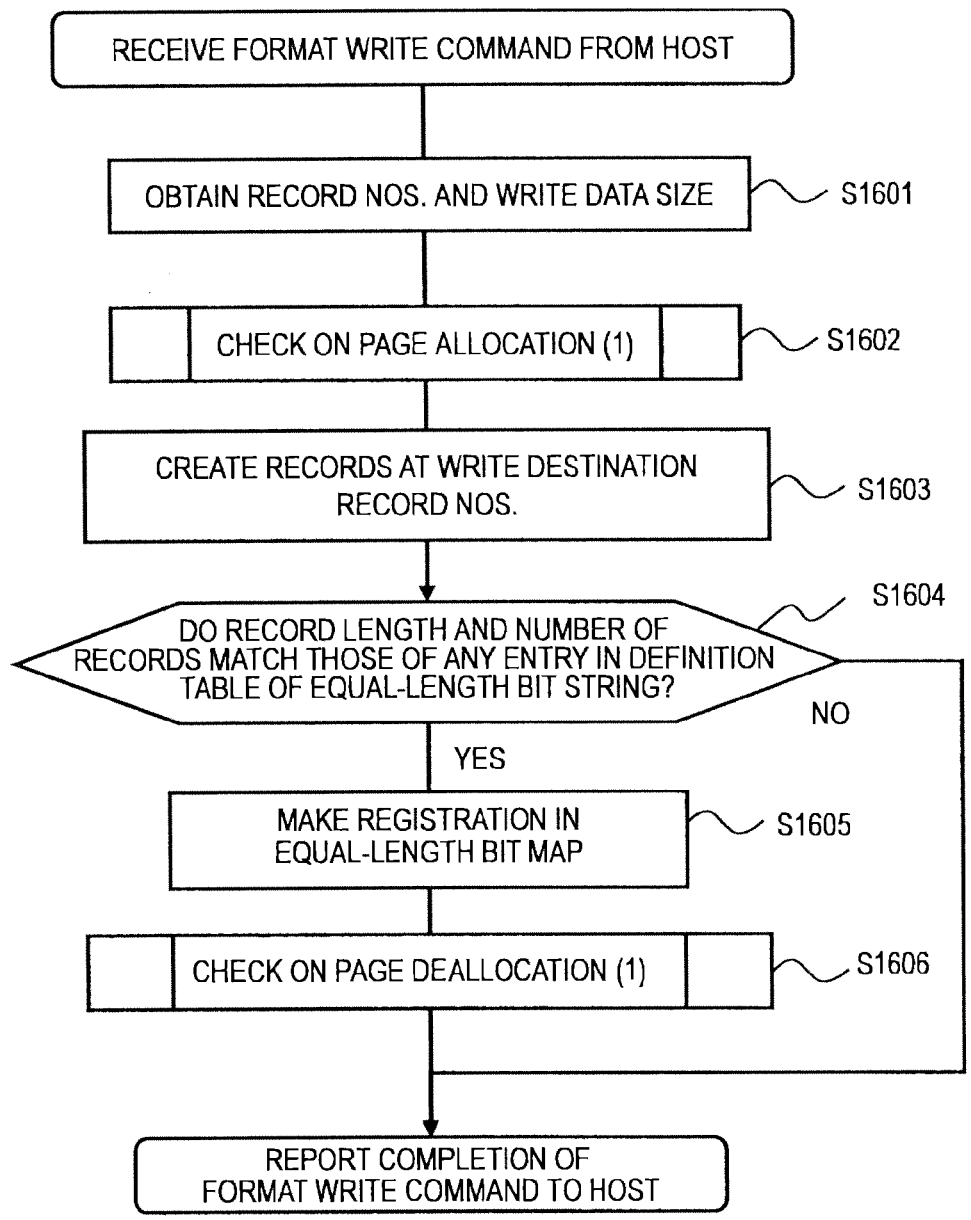
FIG. 16 is a flowchart to illustrate format write command processing in the first embodiment.

At step S1601 in the flowchart of FIG. 16, upon receipt of a format write command from an MF host computer 102, the command controller 211 obtains the record numbers and the data size from the command parameters. The flow proceeds to step S1602. If the command controller 211 cannot obtain the data size from the command parameters, it may examine the length of write data to calculate the data size.

At step S1602, the command controller 211 checks whether a page has been allocated to the virtual storage area of the destination of the write access. If the page is "unallocated", the command controller 211 newly allocates a page from a pool (hereinafter, checking on page allocation (1)).

Figure 17:
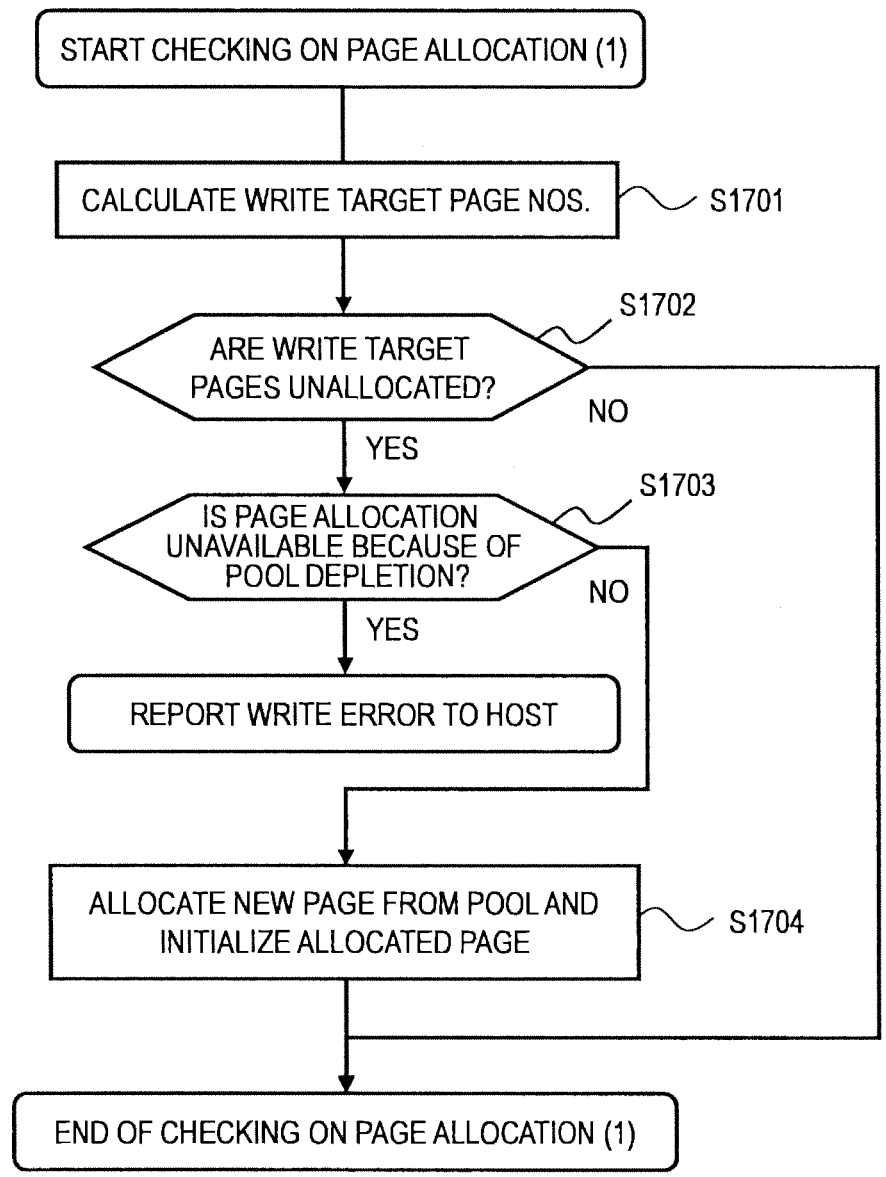
FIG. 17 is a flowchart to illustrate checking on page allocation (1) in the first embodiment.

FIG. 17 is a flowchart of the checking on page allocation (1). The command controller 211 executes steps S1701 to S1704. At step S1701, the command controller 211 refers to the track number and the page size to calculate the number of the user data page including (the user data of) the track in the user data area 1302 and the number of the control information page including (the control data of) the track in the control information area 1303 and proceeds to step S1702.

At step S1702, the command controller 211 obtains page allocation determination information on the user data page and the control information page in the LDEV, based on the page numbers calculated at step S1701 and the PMT 407. If at least either one of the user data page and the control information page is "unallocated", the command controller 211 proceeds to step S1703; if both of them are "allocated", it terminates the checking on page allocation (1) and proceeds to step S1603.

At step S1703, if a pool does not have a remaining page available to be allocated for the "unallocated" user data page or control information page (hereinafter, pool depletion) and cannot provide a page, the command controller 211 reports a write error to the MF host computer 102 and terminates the format write command processing. If the pool has any remaining page for allocation, the command controller 211 proceeds to step S1704.

At step S1704, the command controller 211 newly allocates a page from a pool to the "unallocated" user data page or control information page. Next, the command controller 211 initializes the user data page or the control information page allocated at step S1704, terminates the checking on page allocation (1), and proceeds to step S1603.

A user data page includes user data sections of a plurality of tracks. The initial value of the user data sections is, for example, a zero value. A control information page includes control information of a plurality of tracks and contains, for example, home addresses and Records 0 of the plurality of tracks. The initial values in the control information sections are, for example, track numbers. The control information page further contains an equal-length bit map 1401 and the initial value thereof may be a zero value.

At Step S1603, the command controller 211 sequentially reads count fields starting from Record 1 (the record subsequent to Record 0) in the track designated by the command from the disk 132 to obtain the addresses of the records. If the command controller 211 cannot obtain the address of the record preceding the record designated by the command because there is no such record, it reports a No Record Found error to the MF host computer 102 and terminates the format write command processing.

As described above, in a format write access from an MF host computer 102 to a virtual volume, if there is no record preceding the record whose number is provided for a write parameter, the command controller 211 considers that the operation (hereinafter, locating the record) to find the location in the track has failed for the record to be created (by designation of the command) and reports a No Record Found error to the MF host computer 102.

In this example, in each track (logical track) of an HDEV 311, data are disposed in the order of a home address, Record 0, Record 1, Record 2 . . . . The home address and Record 0 are disposed in the control information section 322 in the LDEV 312. These are data for control use and do not include user data.

At the execution of a read or write to a user data section (including a read or a write for a format write), a control information page is allocated and the initial value is written to it. Records (Record 1, Record 2 . . . ) for storing user data are disposed in the user data section 321 in the LDEV 312.

The command controller 211 creates records designated by the command at the obtained address and proceeds to step S1604. If there exist records subsequent to the designated records, the command controller 211 deletes those records before the foregoing creation of the records.

At step S1604, the command controller 211 refers to the definition table 1501 of the equal-length bit strings to determine whether the record length and the total number of records in the track match those of any one of the equal-length bit strings defined in the table 1501. If any one of the existing records created in the track has a different record length from those of the others, the track is for variable-length records.

If the existing records created in a track have the same record length and the total number of records is the number associated with the record length in the table 1501, the track is a track for equal-length records and the records designated by the command are the last records in the track.

If the result of the determination at step S1604 is NO, the command controller 211 reports a completion of the write command to the MF host computer 102 to terminate the format write command processing. If the result of the determination at step S1604 is YES, the command controller 211 proceeds to step S1605.

At step S1605, the command controller 211 sets the equal-length bit string of the track designated by the command in the equal-length bit map 1401 at the value in the field of bit type defined in association with the record length and the number of records in the table 1501 and proceeds to step S1606.

Figure 18:
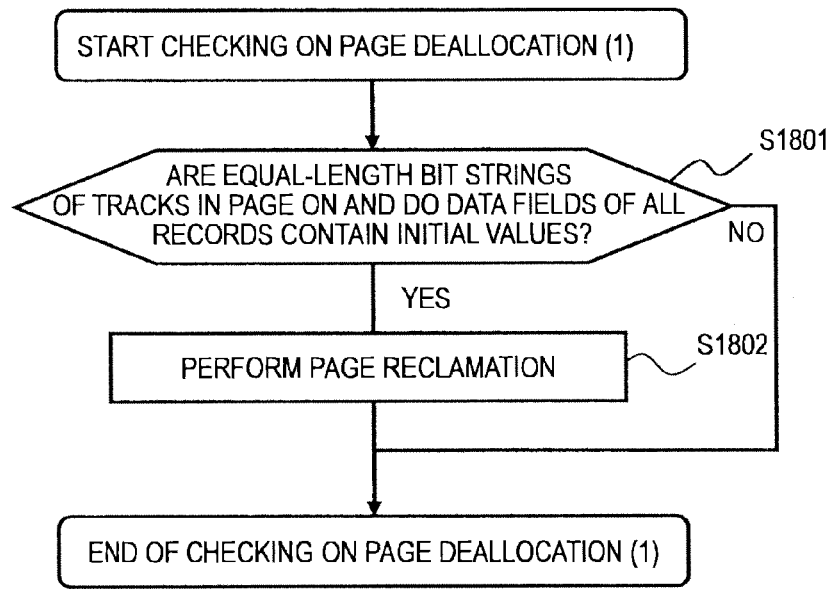
FIG. 18 is a flowchart to illustrate checking on page deallocation (1) in the first embodiment.

At step S1606, the command controller 211 performs checking on page deallocation (1). FIG. 18 is a flowchart of the checking on page deallocation (1). The command controller 211 executes steps S1801 and S1802. At step S1801, the command controller 211 refers to the equal-length bit map 1401 to determine whether the user data page contains all tracks which can be created (whether the page is filled with tracks to the capacity).

Moreover, the command controller 211 refers to the equal-length bit map 1401 to determine whether all of the tracks are tracks for equal-length records. The record length may be different among the tracks. For example, a track of 4 KB record length and a track of 8 KB record length may exist.

The command controller 211 determines whether the data fields of all of the records in the page contain initial values. The command controller 211 directly refers to the data fields or refers to the initial value flags in the count fields to determine whether the data fields contain initial values.

If any one of the foregoing three requirements is not satisfied (NO at S1801), the command controller 211 terminates the checking on page deallocation (1), reports the completion of the write command to the host, and terminates the format write command processing.

If all of the foregoing three requirements are satisfied, that is, if the first to the last tracks in the user data page have been written, all of the tracks are tracks for equal-length records, and the data in all of the data fields are initial values (YES at S1801), the command controller 211 proceeds to step S1802.

At step S1802, the command controller 211 deallocates the user data page and reports the completion of the write command to the MF host computer 102 to terminate the format write command processing. The page deallocation sets the page of the real storage area allocated from a pool to be reallocated. In other words, the command controller 211 sets the page allocation determination information of the page entry in the PMT 407 at "unallocated" and sets the address of the initial value page to the address field 1104.

The determination requirements at step S1801 may be different from the foregoing requirements. For example, not all of the tracks in the user data page are necessary to be formatted and a part of them may be unformatted. An unformatted state of a track indicates that the track does not have any count field, that is, the track is filled up with initial values such as zero values. The initial value in the data field of a formatted record and the initial value in the unformatted part may be the same or different.

For example, upon receipt of a command to delete all records in a track from an MF host computer 102, the command controller 211 writes data so that the delete target track will fall into an unformatted state. Upon receipt of a format write command to delete Record 1 and the subsequent records with command parameters, the command controller 211 writes data so that the format write target track will fall into an unformatted state.

As described above, with regard to a virtual volume that stores user data in units of records, this embodiment does not allocate a page to the virtual volume if data to be stored are control data only and does not include user data in a page where records are created. This configuration achieves capacity control of a virtual volume depending on user data.

As described above, it is preferable that the requirements for page deallocation include that all tracks in a page are tracks for equal-length records. This configuration minimizes the amount of data included in the track control information of a deallocated page. Depending on the design, the foregoing deallocation may be performed on a page including a variable-length record track. In such a case, information on each record length in the variable-length record track is included in the track control information.

Second Embodiment

Hereinafter, a second embodiment of this invention will be described. This embodiment explains processing a write access and processing a read access from an MF host computer 102 to the page deallocated in the first embodiment. To a write access, the storage system 101 reallocates the page to the virtual volume. To a read access, the storage system 101 keeps the page unallocated and returns the initial value.

(Update Write to HDEV 311)

Figure 19:
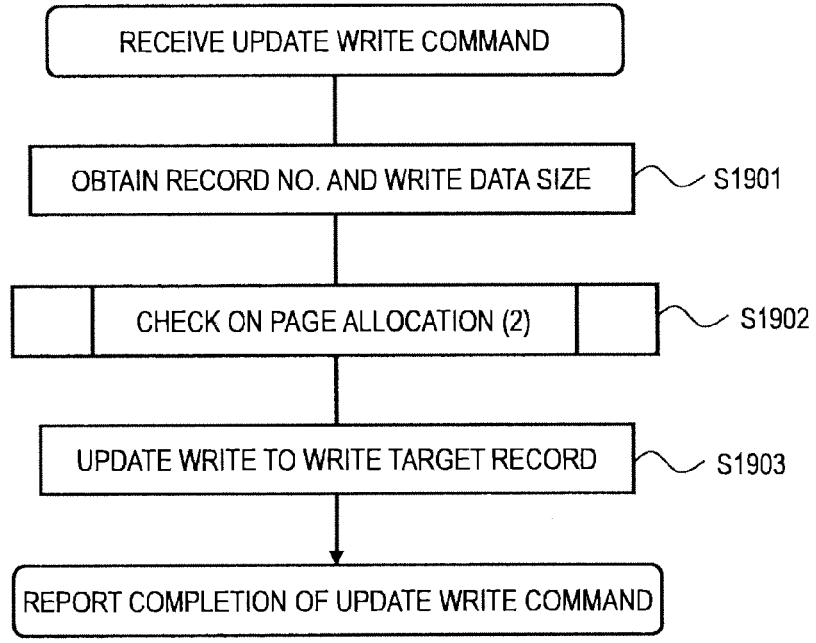
FIG. 19 is a flowchart to illustrate update write command processing in the second embodiment.

First, an update write to an HDEV 311 will be explained. Upon receipt of a write access (hereinafter, update write) from an MF host computer 102 to an HDEV 311 which is managed as an HDEV with virtual volume attributes to update the data field of a record, the command controller 211 updates the record. Hereinafter, operations of the command controller 211 in the update write will be described in accordance with FIG. 19 and FIG. 20.

An update write command includes parameters for the HDEV number, track number, record number, write data, and data size, for example. At step S1901, upon receipt of an update write command from an MF host computer 102, the command controller 211 obtains the record number and the data size from the command parameters and proceeds to step S1902. If the command controller 211 cannot obtain the data size from the command parameters, it may examine the length of the write data to calculate the data size.

At step S1902, if all of the tracks in the write target page are tracks for equal-length records and the write target page is "unallocated" to the virtual storage area of the write access destination, the command controller 211 newly allocates a page to the virtual storage area from a pool (hereinafter, checking on page allocation (2)).

Figure 20:
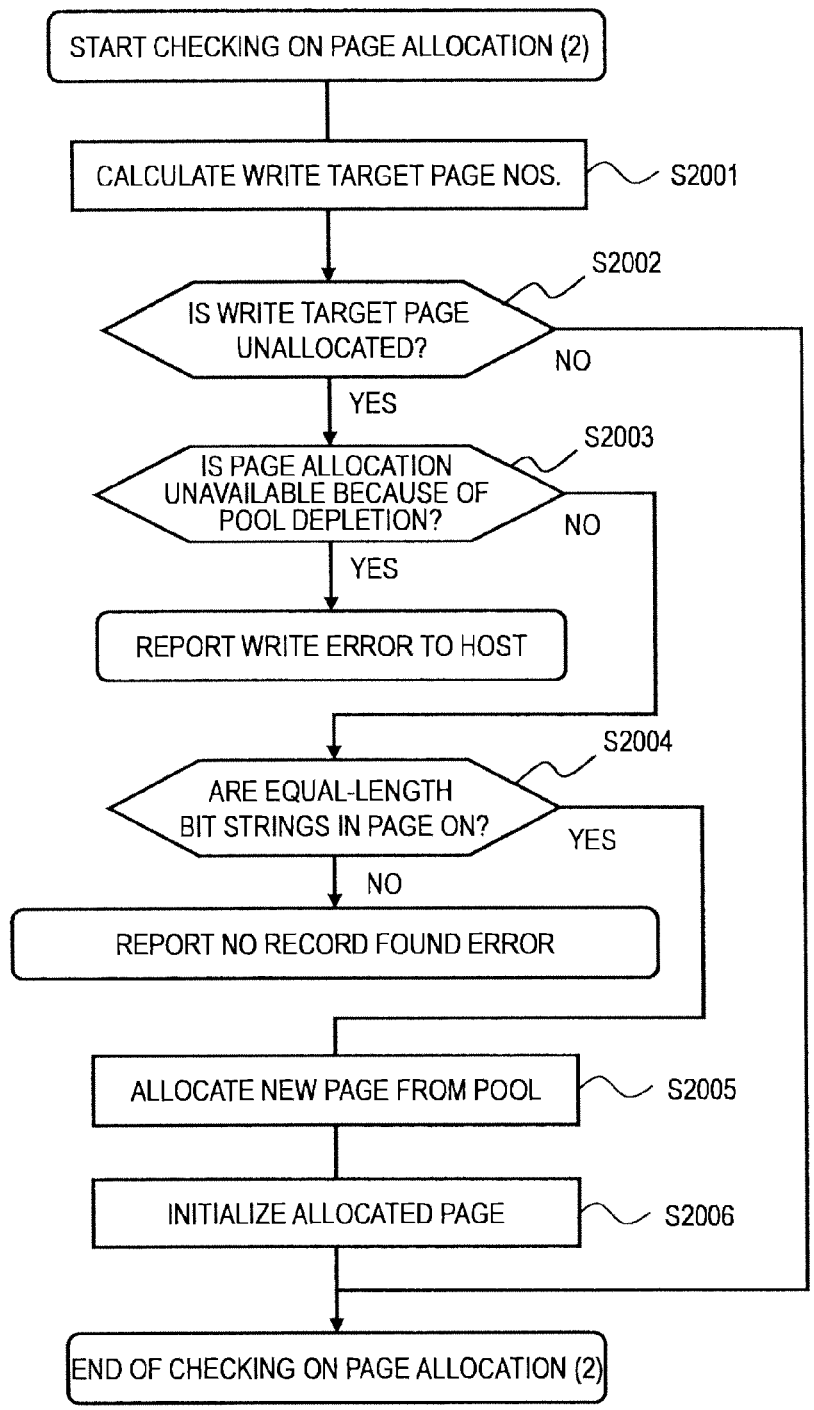
FIG. 20 is a flowchart to illustrate checking on page allocation (2) in the second embodiment.

The checking on page allocation (2) will be described in detail. FIG. 20 is a flowchart of the checking on page allocation (2). In the checking on page allocation (2), the command controller 211 executes steps S2001 to S2006.

At step S2001, the command controller 211 refers to the track number and the page size designated by the command to calculate the number of the user data page including the track in the user data area 1302 and the number of the control information page including the track in the control information area 1303 and proceeds to step S2002.

At step S2002, the command controller 211 obtains page allocation determination information on the user data page in the LDEV (virtual volume), based on the page number calculated at step S2001 and the PMT 407. If the user data page is "unallocated", the command controller 211 proceeds to step S2003. If the user data page is "allocated", the command controller 211 terminates the checking on page allocation (2) and proceeds to step S1903.

At step S2003, if a pool does not have a remaining page which can be allocated for the "unallocated" user data page (pool depletion) and cannot provide a page, the command controller 211 reports a write error to the MF host computer 102 and terminates the update write command processing. If the pool has any remaining page for allocation, the command controller 211 proceeds to step S2004.

At step S2004, the command controller 211 checks whether all of the tracks in the user data page are tracks for equal-length records with reference to the equal-length bit map 1401. If any of the tracks is not a track for equal-length records (NO at S2004), the command controller 211 does not regard the user data page as a page deallocated by the page deallocation (1) described with reference to FIG. 18.

In other words, the command controller 211 determines that the page for storing the record designated by the command has never been allocated and no record is created. The command controller 211 reports a No Record Found error indicating that no record exists to the MF host computer 102 and terminates the update write command processing.

As described above, in an update write access to an HDEV, if there exists no record in the record number provided for a write parameter, the command controller 211 considers that the operation (locating the record) to find the location in a track has failed with respect to the record to be created and reports a No Record Found error to the host.

At step S2004, if all of the tracks in the user data page are tracks for equal-length records, the command controller 211 considers that the user data page is a page that has been deallocated by the previously described page deallocation (1). In other words, the command controller 211 determines that the command controller 211 created all records in the allocated page by itself as per a format write command and then deallocated the page since all the tracks are tracks for equal-length records.

If the result of the determination at step S2004 is YES, the command controller 211 proceeds to step S2005. At step S2005, the command controller 211 newly allocates a page from a pool for (the track of) the "unallocated" user data page and proceeds to step S2006. At this time, the initial value in the newly allocated page is a zero value, for example.

At step S2006, the command controller 211 initializes the user data page allocated at step S2005. The initialized user data page is composed of user data sections (Record 1, Record 2 . . . ) of a plurality of tracks. As described, a track consists of a control information section (a home address and Record 0) and a user data section (Record 1, Record 2 . . . ); the data of the control information section (home address and Record 0) are stored in a different storage area 322.

Each track has a plurality of equal-length records as initial values. The command controller 211 sets the count field (the track number, the record number, the locations and the sizes of the count field and the data field, and the initial value flag) and a predetermined initial value for the data field, for example, a zero value, to each record. Through the foregoing operations, the command controller 211 completes the checking on page allocation (2) and proceeds to step S1903.

At step S1903, the command controller 211 sequentially reads the count fields starting from Record 1 in the track from the disk 132 to obtain the address of the record designated by the command. If the command controller 211 cannot obtain the address of the record designated by the command because there is no count field of any one of the records, the command controller 211 reports a No Record Found error to the MF host computer 102 and terminates the update write command processing.

The command controller 211 updates the record at the obtained address (the record designated by the command) with the user data received by the MF host computer 102 and reports the completion of the write command to the MF host computer 102. This is the end of the update write command processing.

At step S1903, the command controller 211 may check whether the data fields of the records contain initial values and reflects the respective results to the initial value flags in the count fields of the records. In such a case, if a data field contains an initial value, the initial value flag is OFF (for example, "0"); if the data field holds a value other than the initial value, the initial value flag is ON (for example, "1"). At step S1903, the command controller 211 may perform the previously described checking on page deal-location (1) to the page including records.

The foregoing description has provided explanation on operations of the command controller 211 to update a record by an update write from an MF host computer 102 to a record in an HDEV 311 managed as an HDEV with virtual volume attributes. These operations enable appropriate responses to an update write to a deallocated page.

(Read from HDEV 311)

Figure 21:
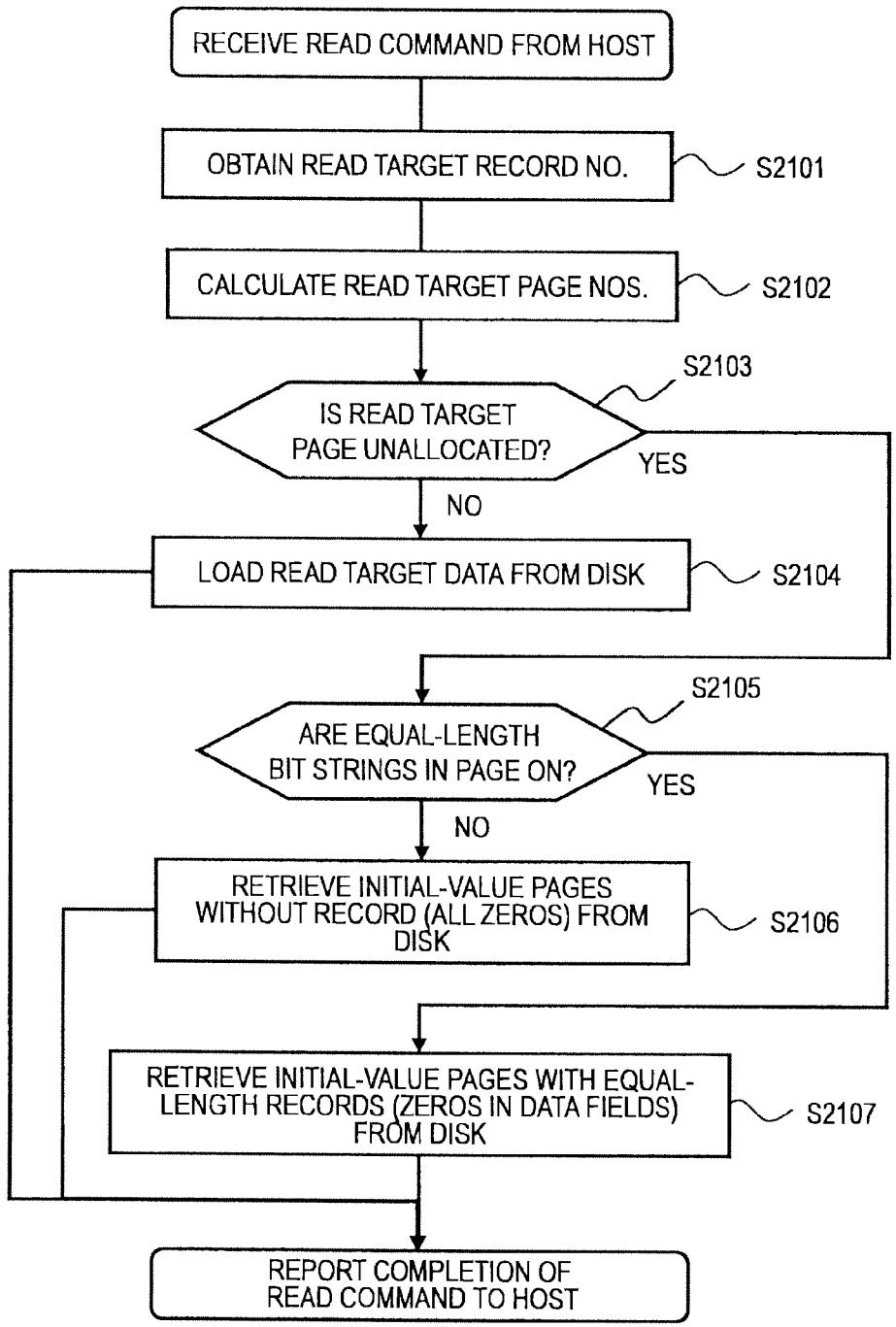
FIG. 21 is a flowchart to illustrate read command processing in the second embodiment.

Next, a read from an HDEV 311 will be explained. In response to a read access from an MF host computer 102 to refer to the data field of record in an HDEV 311 which is managed as an HDEV with virtual volume attributes, the command controller 211 operates to make the record readable. The operations of the command controller 211 will be described with reference to FIG. 21.

At step S2101, upon receipt of a read command from an MF host computer 102, the command controller 211 obtains the record number from the command parameters and proceeds to step S2102.

At step S2102, the command controller 211 uses the track number and the page size obtained from the command parameters to calculate the number of the user data page including the track in the user data area 1302 and the number of control information page including the track in the control information area 1303 and proceeds to step S2103.

At step S2103, the command controller 211 obtains page allocation determination information on the user data page in the LDEV, based on the page number calculated at step S2102 and the PMT 407. If the user data page is "allocated" (NO at S2103), the command controller 211 proceeds to step S2104; if the user data page is "unallocated" (YES at S2103), the command controller 211 proceeds to step S2105.

At step S2104, the command controller 211 loads the read target track from the "allocated" user data page to the CM 124 using the RAID controller 212, transmits the track in the CM 124 to the MF host computer 102, and reports the completion of the read command.

At step S2105, the command controller 211 refers to the equal-length bit map 1401 to determine whether all of the tracks in the user data page are tracks for equal-length records. If any one of the tracks is not a track for equal-length records (NO at S2105), the command controller 211 proceeds to step S2106. In this case, the command controller 211 determines that the record designated by the command has not been created.

If all of the tracks in the user data page are tracks for equal-length records (YES at S2105), the command controller 211 determines that the page is a deallocated page explained in the first embodiment and proceeds to step S2107.

At step S2106, the command controller 211 retrieves the read target track in an initial value page (1) from a disk 132 using the RAID controller 212 and makes it readable from the MF host computer 102. For example, the initial value in the initial value page (1) is a zero value; accordingly, making the track readable from the MF host computer 102 means that the command controller 211 cannot find the count field of the read target record and reports a No Record Found error to the MF host computer 102.

If the control information page of the record designated by the command is "unallocated", the command controller 211 cannot read the equal-length bit map 1401; accordingly, it reports a No Record Found error to the MF host computer 102 and terminates the read command processing.

At step S2107, the command controller 211 retrieves the read target track in an initial value page (2) from a disk 132 and makes it readable from the MF host computer 102. The initial value page (2) includes equal-length records of the length defined by the value of an equal-length bit string in the number defined by the value of the equal-length bit string. The data fields of the records contain initial values, for example, zero values.

The command controller 211 obtains the value corresponding to the data field of the read target record, which is the initial value, from the initial value page (2) and transmits it as the data field of the read target record to the MF host computer 102. Then, the command controller 211 reports the completion of the read to the MF host computer 102. As understood from the above, in a read access to a deallocated page, the page is kept unallocated without page reallocation.

The above-mentioned initial value page (1) is a user data page which is managed separately from "unallocated" pages in a pool 313; the data therein are zero values and each pool contains one such page. At step S2105, if a user data page in an HDEV 311 with virtual volume attributes is "unallocated" and the equal-length bit strings for all the tracks in the page are not ON, the MF host computer 102 can regard the initial value page (1) as readable.

The above-mentioned initial value page (2) is a user data page which is managed separately from "unallocated" pages or the initial value page (1) in the pool 313. The page consists of data sections 321 of a plurality of tracks; the count fields of the records in the data sections 321 contain initial values. Each count field contains information on the locations and sizes of the fields (the count field and the data field) of the record and, in addition, information on the track number and an initial value flag.

At step S2105, if the user data page in an HDEV 311 with virtual volume attributes is "unallocated" and the equal-length bit strings for all of the tracks in the page are ON, the MF host computer 102 reads the initial value page (2).

The data field of the record in the initial value page (2) contains a zero value, for example; the location and the size of the count field in the record are common to the records. Each count field includes a track number and a record number; tracks in the initial value page (2) can be uniquely identified. The initial value page (2) is in each pool. Since the number of tracks increases with the volume size of the HDEV 311, the initial value page (2) may be separated into a plurality of pages.

The foregoing description has provided explanation on operations of the command controller 211 to make a record readable in response to a read access referring to the data field of a record in an HDEV 311 managed as an HDEV with virtual volume attributes from an MF host computer 102. These operations enable an appropriate response to a read access to a deallocated page. In addition, since the page is kept un-allocated, the capacity of the virtual volume does not increase or reallocation is not necessary.

The command controller 211 does not need to use an initial value page. If the command controller 211 receives a read access to an uncreated record, it reports a No Record Found error to the MF host computer 102. On the other hand, if it receives a read access to a record which had been once created but the page containing the record has been deallocated, it transmits a predetermined initial value to the MF host computer 102. The initial value may be preset to the command controller 211.

Third Embodiment

In the first embodiment, deallocating a page in response to a format write has been described. In this embodiment, deallocating a page of an HDEV 311 as per a page deallocation command will be described. The page deallocation command includes a parameter for the HDEV number, for example. The command controller 211 deallocates a page which has been allocated to an LDEV (virtual volume) with virtual volume attributes as per a page deallocation command from the management host computer 103.

This command processing enables page deallocation to be controlled under the management of the management host computer 103. If user data of all the records in a page become equal to initial values because of update write, for example, the page can be deallocated. It is preferable that this embodiment be implemented in the system together with the first embodiment; but either one of these may be implemented.

Figure 22:
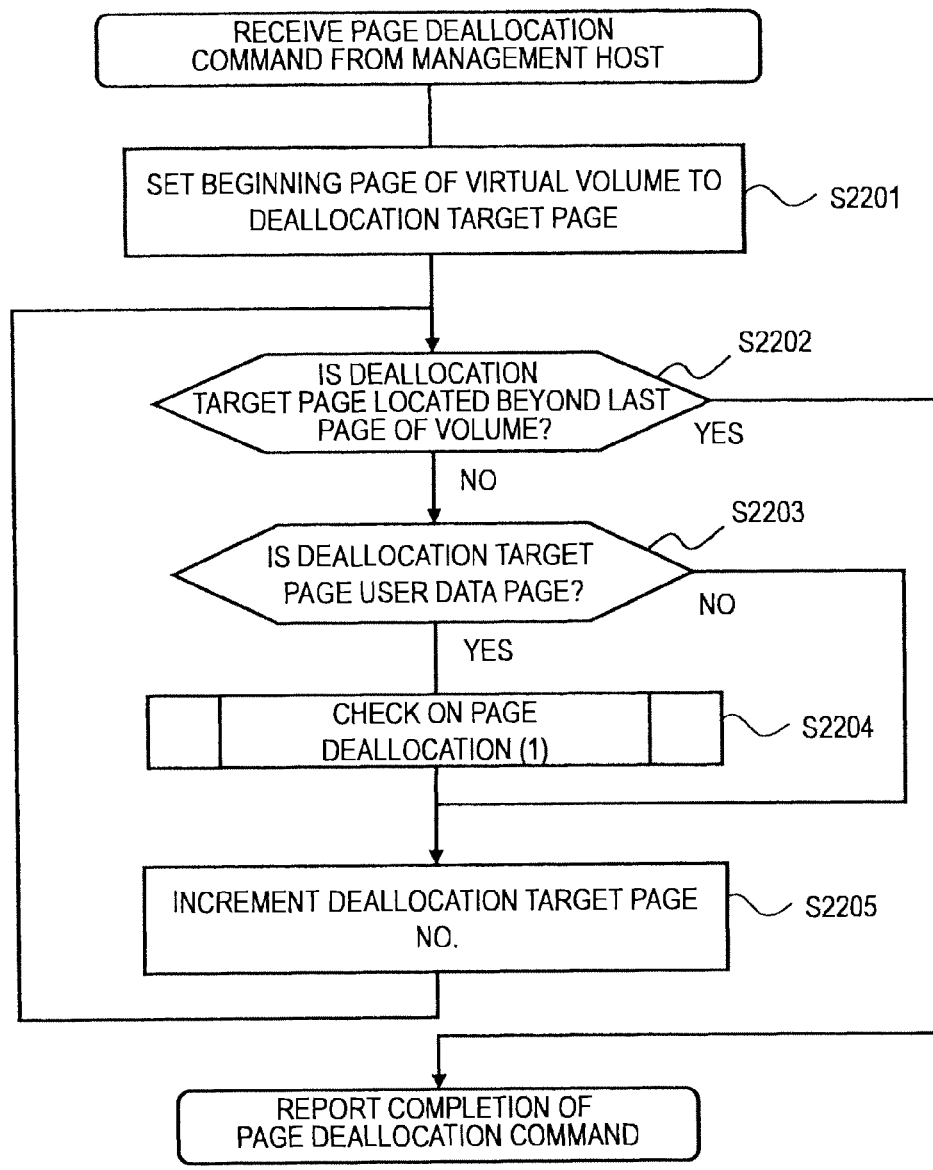
FIG. 22 is a flowchart to illustrate page deallocation command processing in the third embodiment.

FIG. 22 is a flowchart illustrating operations of the command controller 211 to deallocate pages in an HDEV 311 in response to a page deallocation command from a management host computer 103 to the HDEV 311 managed as an HDEV with virtual volume attributes. Upon receipt of a page deallocation command from the management host computer 103, the command controller 211 obtains the HDEV number from the command parameter and proceeds to step S2201.

At step S2201, the command controller 211 obtains the LDEV number associated with the HDEV designated by the command based on the table 401 of the relationships between HDEV numbers and LDEV numbers and the HDEV number designated by the command. Next, the command controller 211 obtains the PMT 407 based on the PMT management directory 408 and the obtained LDEV number. The command controller 211 sets the beginning page in the PMT 407 to the deallocation target page and proceeds to step S2202.

At step S2202, the command controller 211 calculates the address of the deallocation target page based on the deallocation target page and the page size. The command controller 211 examines whether the deallocation target page is located beyond the last page of the user data area. If it is (YES at S2202), the command controller 211 reports the completion of the page deallocation command to the management host computer 103 and terminates the page deallocation command processing. If the deallocation target page is not located beyond the last page of the user data area (NO at S2202), the command controller 211 proceeds to step S2203.

At step S2203, the command controller 211 determines whether the deallocation target page is a user data page. If the deallocation target page is a control information page including a control information area (NO at S2203), the command controller 211 increments the deallocation target page (S2205) and returns to step S2202. This step prevents loss of control information in a control information page.

If the deallocation target page is a user data page composed of user data areas only (YES at S2203), the command controller 211 proceeds to step S2204. This step is the same as the foregoing checking on page deallocation (1). Specifically, at step S2204, the command controller 211 checks the equal-length bit strings for all the tracks in the deallocation target page of a user data page and the values in the data fields of all the records.

If all of the tracks in the page are tracks for equal-length records and all of the data fields contain initial values, the command controller 211 deallocates the page. As explained in the first embodiment, requirements to deallocate a page may include that all of the tracks in the page have been created or permit that a part of the page is unformatted. The number of records to be stored in a page is smaller than the total number of records that can be stored in the page. The requirements to deallocate a page may permit the page to include a track for variable length records.

At deallocating a user data page, the command controller 211 may perform checking on page deallocation (2) described below for the page (control information page) including the control information sections associated with the user data sections of the user data page. In the checking on page deallocation (2), the command controller 211 checks whether the control information page satisfies the following requirements (1) and (2). If it satisfies the both of the requirements, the command controller 211 deallocates the control information page.

The requirement (1) is that, if the control information page includes a user data section, the track of the user data section is a track for equal-length records and the data fields of all the records contain initial values. The condition (2) is that the page to store the user data sections associated with all of the control information sections in the control information page is unallocated. If the records in the associated user data sections have the equal-length and the data of the records are initial values, the command controller 211 can determine that the requirement (2) is satisfied.

If the requirements (1) and (2) are satisfied, the command controller 211 deallocates the control information page. If either one of the requirements is not satisfied, the command controller 211 terminates the checking on page deallocation (2).

The foregoing description has provided explanation on operations of the command controller 211 to deallocate pages in an HDEV 311. In the above configuration, the command controller 211 executes the checking on page deallocation in response to a page deallocation command. The command controller 211 may execute the checking on page deallocation in response to a different event after a format write. For example, the command controller 211 may execute the checking on page deallocation every time a predetermined time period has passed or at rebalancing data in a virtual volume.

Fourth Embodiment

This embodiment explains control of page allocation and page deallocation in a remote copy. Specifically, control of page allocation and page deallocation synchronized with a remote copy between an HDEV 311 with normal volume attributes and an HDEV 311 with virtual volume attributes will be described. First, with reference to the flowchart of FIG. 23, a copy from a normal volume to a virtual volume will be explained and then, with reference to the flowchart of FIG. 24, a copy from a virtual volume to a normal volume will be explained.

Figure 23:
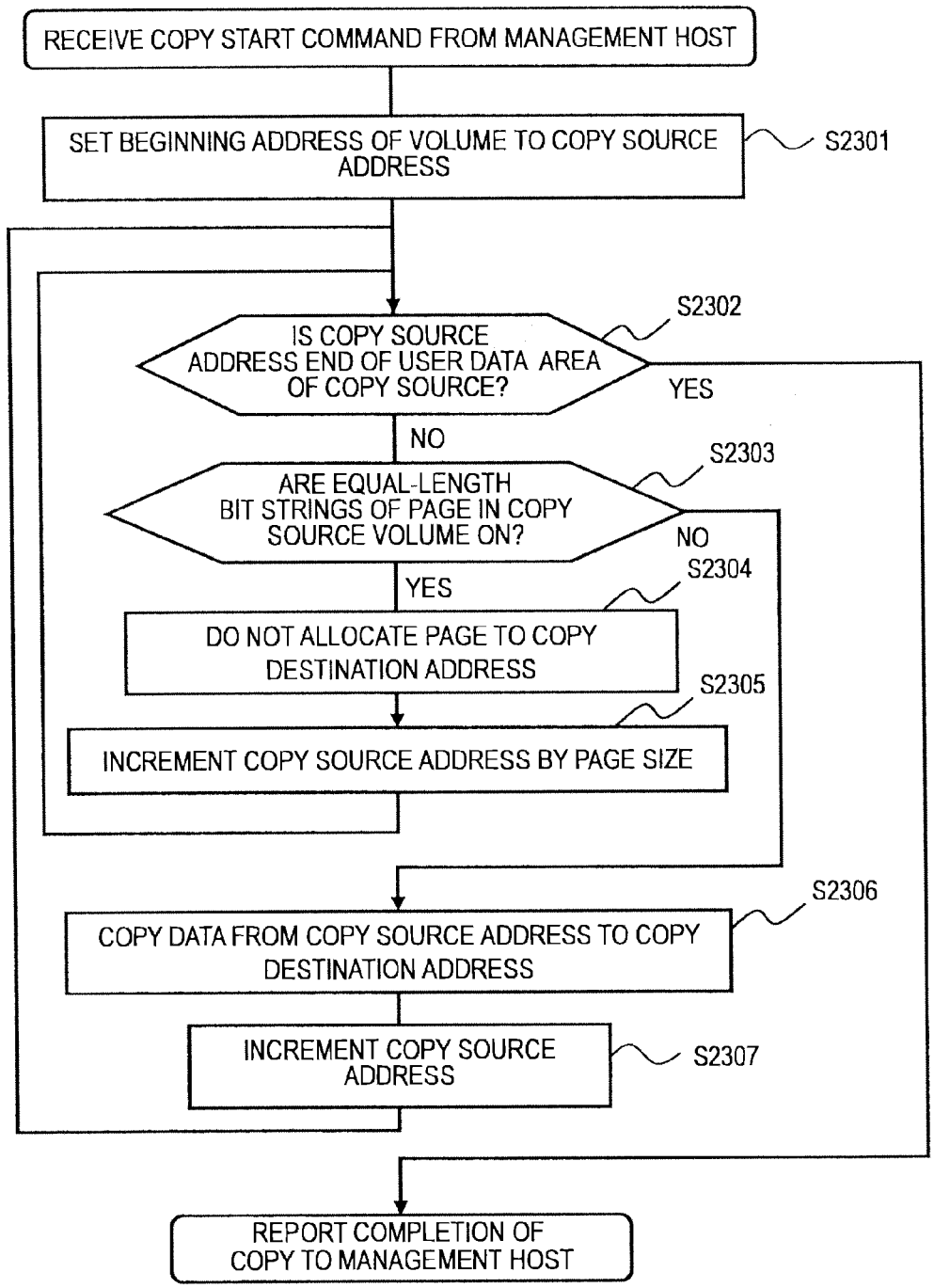
FIG. 23 is a flowchart to illustrate a remote copy from a normal volume to a virtual volume in the fourth embodiment.

The process of the flowchart of FIG. 23 copies data in an LDEV 312 stored in a normal volume in a first storage system 101 to an LDEV 312 stored in a virtual volume in a second storage system 101.

If data of a page (data to be stored in a page) satisfy the requirements for page deal-location described in the first and the third embodiments, the first storage system 101 does not transmit the data to the second storage system 101. The second storage system 101 does not allocate a page for the data to the virtual volume; the state of the page is "unallocated". Hereinbelow, returning the state of the page to "unallocated" is called page deallocation.

In a remote copy from the first storage system 101 to the second storage system 101, such deallocation of a page which holds data unnecessary to be transferred only can save the capacity required in the second storage system 101.

In an example, the first storage system 101 and the second storage system 101 carry out a remote copy in the following manner. First, the first command controller 211 in the first storage system 101 receives a request for remote copy from the management host computer 103.

The first command controller 211 loads the user data sections and the control information sections of a part or all of the tracks in a first LDEV 312 in the first storage system 101 as copy object data to a first cache memory 124 from one or more disks 132.

At step S2301, the first command controller 211 sets a copy source address at the beginning track number of the first LDEV 312 and the flow proceeds to step S2302. At step S2302, the first command controller 211 checks whether the copy source address has reached the last track number of the first LDEV 312. If it has reached the last track number (YES at S2302), the first command controller 211 reports the completion of the copy and terminates the copy command processing.

If the copy source address has not reached the last track number in the first LDEV 312 (NO at S2302), the flow proceeds to step S2303. At step S2303, for each of the tracks in a range of a page of the copy object data held in the first cache memory 124, the first command controller 211 determines whether the equal-length bit string for the track is ON (all the records in the track have the same record length) and further whether the data of all the records in the track are initial values.

If the first command controller 211 determines that all the tracks in the range of a page in the cache memory 124 are tracks for equal-length records and the data in all the records in the range are initial values (YES at S2303), it does not transmit the copy object data in the range of the page and the flow proceeds to step S2304. If either one of the requirements is not satisfied (NO at S2303), the flow proceeds to step S2306. Within the range of a page, the record lengths of equal-length records may be different among tracks.

At step S2304, if the copy object data are not transmitted to the second cache memory 124 through the second inter-storage system I/F 126 in the second storage system 101, the second command controller 211 in the second storage system 101 does not allocate a real storage area (page) from a pool 313 in the second storage system 101 to a second LDEV 312 configured in a virtual volume. Next, at step S2305, the first command controller 211 increments the copy source address by the number of tracks in the page and the process returns to step S2302.

At step S2306, the first command controller 211 transmits a part or all of the tracks of the LDEV 312 in the first cache memory 124 in given units of data. The unit of data may be user data sections of one or more tracks or control information sections of one or more tracks.

On the other hand, the second command controller 211 in the second storage system 101 receives the copy object data from the first command controller 211 through the inter-storage system I/F 126. The second command controller 211 starts receiving copy data and writes the received copy object data to the second cache memory 124 in the second storage system 101.

The second LDEV 312 in the second storage system 101 is configured in a virtual volume used by the previously described thin provisioning function. The second command controller 211 determines whether real storage areas have been allocated for the page including the user data sections and the page including the control information sections.

Specifically, the second command controller 211 refers to the PMT 407 and the PMT management directory 408 with the LDEV number of the LDEV 312 and checks whether write destination pages (real storage areas) have been allocated from a pool 313 to the write target virtual areas for the data sections and the control information sections belonging to the copy object data in the second cache memory 124.

If it determines that a real storage area has not been allocated for the page including the user data sections or the control information sections, the second command controller 211 allocates a page in a pool 313 for the page including the user data sections or the control information sections.

Specifically, in the case where a write destination page is unallocated for the user data sections of one or more tracks in the second cache memory 124 and the user data sections of these tracks contain records, the second command controller 211 refers to the management table 405 with the LDEV number of the LDEV 312 to obtain the pool number associated to the LDEV number.

The second command controller 211 further refers to the management table 406 with the obtained pool number to obtain the disk number associated with the pool number, and allocates real storage areas in units of pages from one or more disks 134 belonging to the pool 313 associated with the LDEV number of the LDEV 312.

In similar, if a write destination page is unallocated for the previously described control information sections of one or more tracks in the second cache memory 124, the second command controller 211 refers to the management table 405 with the LDEV number of the LDEV 312 to obtain the pool number associated to the LDEV number.

The second command controller 211 further refers to the management table 406 with the obtained pool number to obtain the disk numbers associated with the pool number, and allocates a real storage area in unit of a page from one or more disks 134 belonging to the pool 313 associated with the LDEV number of the LDEV 312.

Next, the second command controller 211 writes the data sections and the control information sections in the second cache memory 124 to the allocated real storage areas. Specifically, if write destination page of the user data sections belonging to the copy object data has been allocated for a write destination virtual area in the second cache memory 124, the second command controller 211 writes the user data sections belonging to the copy object data to one or more second disks 132 that constitute the real storage area of the pool 313 through the RAID controller 212.

In similar, if a write destination page of the control information sections belonging to the copy object data has been allocated for write destination virtual area in the second cache memory 124, the second command controller 211 writes the control information sections belonging to the copy object data to one or more second disks 132 that constitute the real storage area of the pool 313.

The second command controller 211 searches the PMT 407 for the page entry including the user data sections of the write access destination tracks, registers the beginning address of the newly allocated page, and updates the allocation determination information into "allocated". Similarly, the second command controller 211 searches the PMT 407 for the page entry of the control information sections of the write access destination tracks, registers the disk number and the beginning address of the newly allocated page in the disk, and updates the allocation determination information into "allocated".

Next, the second command controller 211 writes the user data sections of the one or more tracks to one or more second disks 132 that constitutes the real storage area of the pool 313 and writes the control information sections of the one or more tracks to one or more second disks 132 that constitutes the real storage area of the pool 313.

The above description is the explanation on the data copy at step S2306. Then, the flow proceeds to step S2307. At step S2307, the first command controller 211 increments the track number of the copy source address and the process returns to step S2302.

The above description is an example of a remote data copy from a first LDEV 312 with normal volume attributes in the first storage system 101 to a second LDEV 312 with virtual volume attributes in the second storage system 101. The above-described requirements for not to transfer data (records) are merely examples and other requirements may be employed as explained in the first embodiment. For example, a page not to transfer records may include variable length records.

Even if the deallocation requirements are satisfied at step S2303, the first command controller 211 may transmit the tracks in a range of a page in the first cache memory 124 to the second cache memory 124. In this case, at step S2304, the second LDEV 312 is allocated a page from the pool 313 in the second storage system 101 and the transmitted tracks are written to the LDEV 312.

Moreover, after the copy object data is written to the second LDEV 312, the second command controller 211 may carry out the foregoing checking on page deallocation (1) for the copy destination page. Although data transfer requires the page (real storage area) in the second storage system, the deallocation thereafter enables efficient use of the real storage area.

Figure 24:
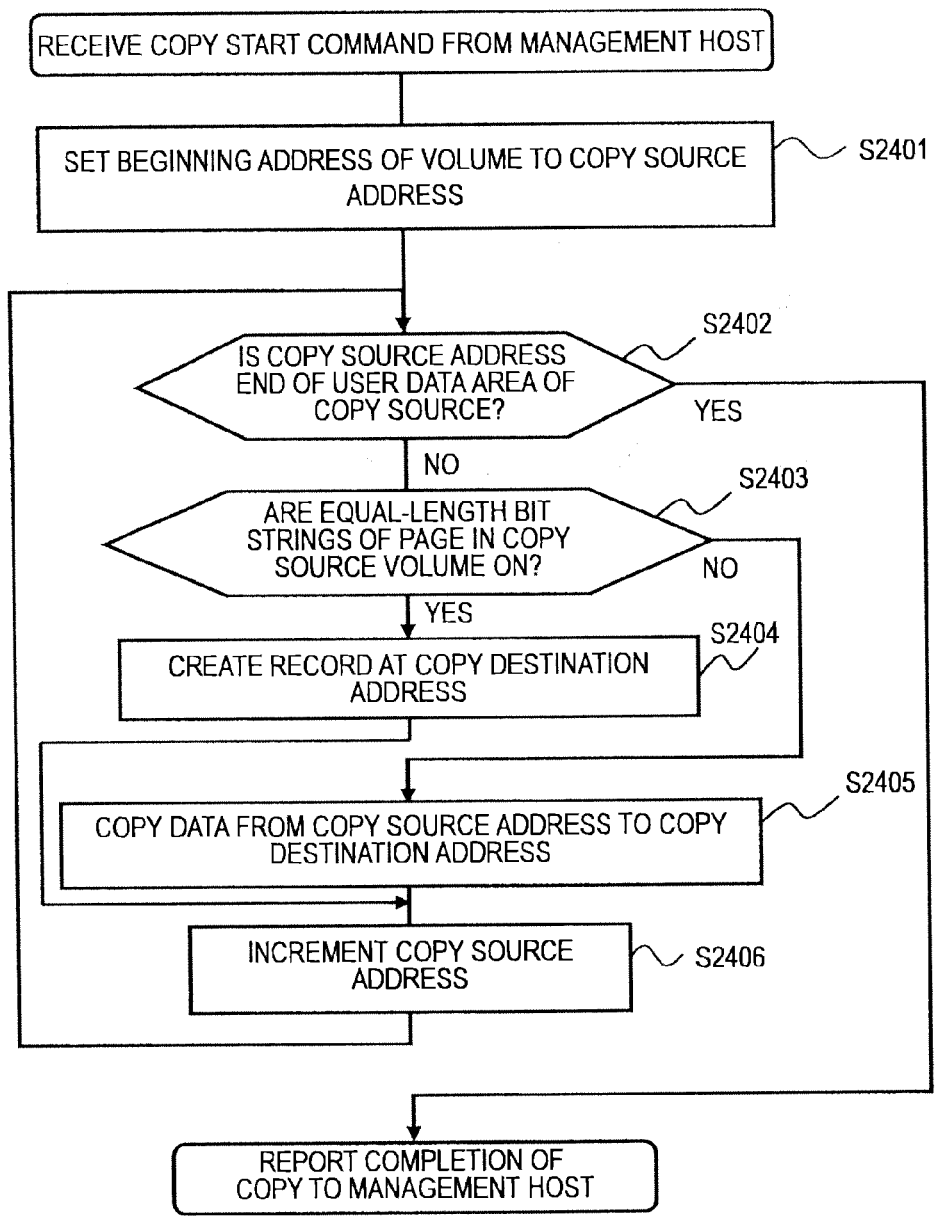
FIG. 24 is a flowchart to illustrate a remote copy from a virtual volume to a normal volume in the fourth embodiment.

Next, page allocation in a remote copy between an HDEV 311 with virtual volume attributes and an HDEV 311 with normal volume attributes will be described with reference to the flowchart of FIG. 24. Hereinafter, copying data in a virtual volume in the first storage system 101 to a normal volume in the second storage system 101 will be explained.

As explained in the first and the third embodiments, in the storage system of this invention, a page of a real storage area may not be allocated for data in a virtual volume. In a normal volume, a real storage area is allocated for such data to which a page is not allocated in a virtual volume.

The first storage system 101 in this embodiment locates a page in which records have been created but is unallocated to a virtual volume and transmits data to locate the data (records) in the page to the second storage system 101 together with the data for which a page has been allocated (which is held in the page). This operation enables accurate copy of data in a virtual volume to a normal volume.

In an example, the first storage system 101 and the second storage system 101 perform a remote copy as follows. At step S2401 in FIG. 24, the first command controller 211 sets a copy source address at the beginning track number of the first LDEV 312 and the flow proceeds to step S2402.

At step S2402, the first command controller 211 checks whether the copy source address has reached the last track number of the first LDEV 312. If it has reached the last track number (YES at S2402), the first command controller 211 reports the completion of the copy to the management host and terminates the copy command processing. If it has not (NO at S2402), the flow proceeds to step S2403.

At step S2403, the first command controller 211 determines whether the equal-length bit string for the track is ON (the bit type shows any one of the predetermined fixed lengths), and further, the data fields of the records in the track contain initial values, for each track in the copy object data stored in the first cache memory 124. This step determines whether the page contains records created therein but is unallocated. Accordingly, these determination requirements are the same as the requirements for page deallocation described in the first and the third embodiments.

If the first command controller 211 determines that all the tracks in the range of one page in the cache memory 124 are tracks for equal-length records and the data fields of all the records contain initial values (YES at S2403), the flow proceeds to step S2404. At step S2404, the second command controller 211 creates equal-length records in the tracks at the copy destination address in the second LDEV 312 in the second storage system 101 and writes initial values as user data in the records.

Specifically, the second command controller 211 obtains information on the record lengths of individual tracks, such as the equal-length bit strings of the individual tracks, from the first command controller 211. These are the data to locate the data (tracks) in the page. The second command controller 211 does not receive the copy object data from the first storage system 101. The second command controller 211 refers to the information on the record length of each track and creates equal-length records in the track. Then, the flow proceeds to step S2406. It should be noted that the first storage system 101 may transmit all data in the page to the second storage system 101.

If either requirement is not satisfied at step S2403 (NO at S2403), the flow proceeds to step S2405. At step S2405, the first command controller 211 transmits a part or all of the tracks of the LDEV 312 in the first cache memory 124 by predetermined units of data. The unit of data may be the user data sections of one or more tracks or the control information sections of one or more tracks.

On the other hand, when the second command controller 211 receives the copy object data from the first command controller 211 through the second inter-storage system I/F 126 in the second storage system 101, the second command controller 211 starts receiving the copy data and writes the received copy object data to the second cache memory 124 in the second storage system 101.

At step S2406, the first command controller 211 increments the track number of the copy source address and returns to step S2402. The foregoing description is an example of a remote data copy from the first LDEV 312 stored in a virtual volume in the first storage system 101 to the second LDEV 312 stored in a normal volume in the second storage system 101.

The above-described configuration is a storage system that consists of the first storage system and the second storage system, but the page allocation control in this embodiment can be applied to a copy from a volume to volume in the first storage system. If regarding the first and the second storage systems as a single storage system, the controllers 131 of the first and the second storage systems are an integrated controller for the storage system.

Fifth Embodiment

In a format write in this embodiment, if the data to be stored in a page satisfy the requirements for checking on page deallocation (1) in the first embodiment, the storage system 101 does not allocate the page to a virtual volume. Unlike the first embodiment, this embodiment keeps a page unallocated without deallocating the page after allocation.

Hereinafter, format write of equal-length records in a range specified by an MF host computer 102 will be described. In the range designated by the MF host computer 102, if record lengths in all the tracks for a page are the same fixed length and the data fields of all the records contain initial values, the storage system 101 does not allocate a page for the data to keep the page unallocated. The requirements not to allocate a page may be any other requirements explained in the first embodiment.

In a format write access to an HDEV 311 managed as an HDEV with virtual volume attributes, the MF host computer 102 issues an explicit command to write equal-length records containing initial values (for example, zero values) in their data fields to the tracks in the designated range. This write command includes parameters for the HDEV number, the beginning track number, the last track number, the length of data fields common to all the records (for example, 4 KB), and the number of records per track, for example.

Figure 25:
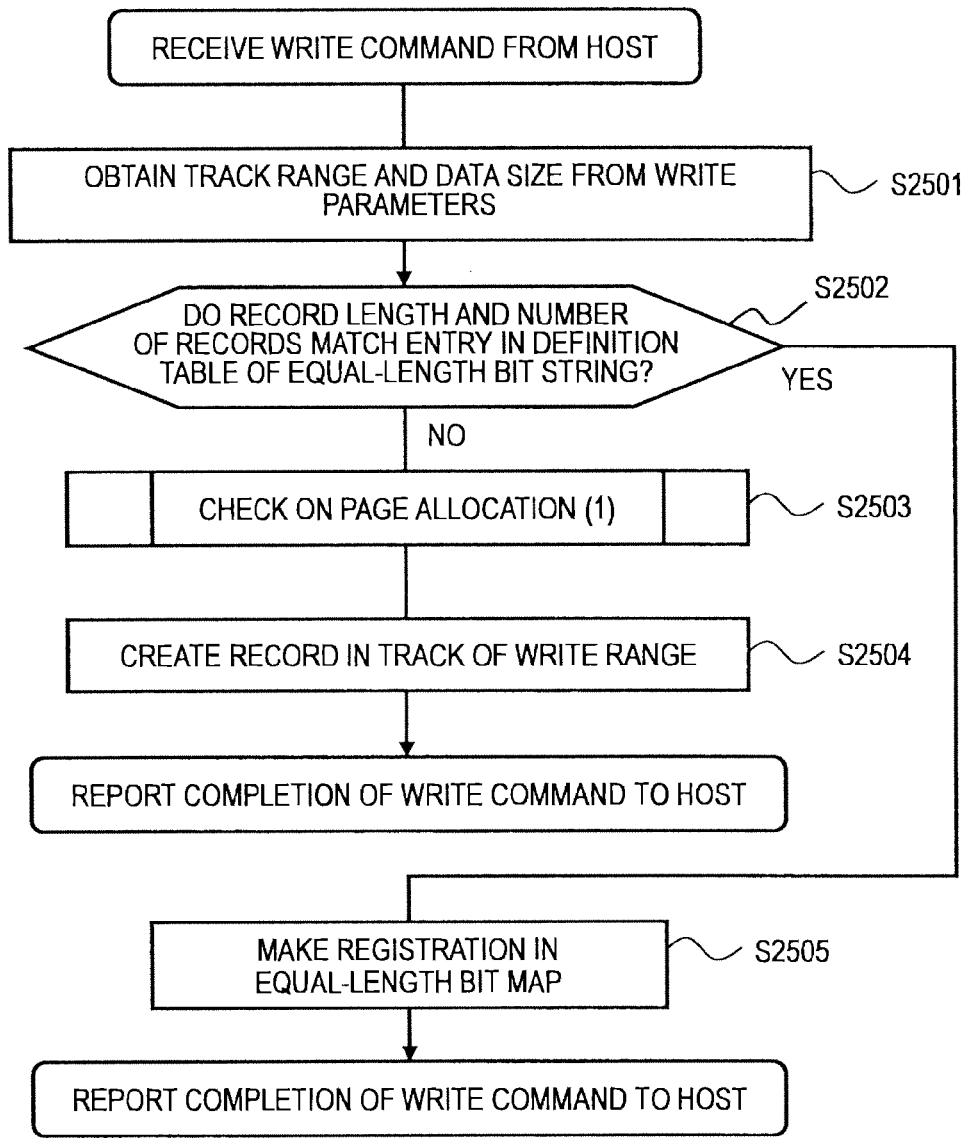
FIG. 25 is a flowchart to illustrate page allocation control in a data write in the fifth embodiment.

At step S2501 in the flowchart shown in FIG. 25, upon receipt of a write command from an MF host computer 102, the command controller 211 obtains the beginning track number, the last track number, and the length of data fields of records from the command parameters and proceeds to step S2502.

At step S2502, the command controller 211 refers to the equal-length bit definition table 1501 to determine whether the obtained length of data fields of records and the obtained number of records match the record length and the number of records of any one of the equal-length bit strings defined in the table 1501. If no matching entry is found (NO at S2502), the command controller 211 proceeds to step S2503.

At step S2503, the command controller 211 checks whether any page is allocated to the virtual storage area including the tracks from the obtained beginning track number to the obtained last track number. If a page is "unallocated", the command controller 211 newly allocates a page from a pool (refer to the foregoing checking on page allocation (1)).

Next, the command controller 211 proceeds to step S2504. At step S2504, the command controller 211 carries out a format write to all the tracks in the page allocated at step S2503 so that the length of data fields of records will be the length of data fields obtained from the command parameters and the number of records per track will be the number of records obtained from the command parameters. Upon completion of the format write, the command controller 211 reports the completion of the write command to the MF host computer 102 and terminates the write command processing.

At step S2502, if the obtained parameters match the record length and the number of records of any one of the equal-length bit strings defined in the table 1501 (YES at S2502), the command controller 211 proceeds to step S2505.

At step S2505, the command controller 211 checks whether any page is allocated to the virtual storage area including the tracks from the obtained beginning track number to the obtained last track number designated by the command. If a page is "unallocated", the command controller 211 sets the bits to the equal-length bit strings 1403 associated with the relevant track range in the equal-length bit map management 1401 and keeps the page "unallocated". If the page is "allocated", the command controller 211 may deallocate the page.

As set forth above, preferred embodiments of this invention have been described, but this invention is not limited to the above-described embodiments. Those skilled in the art can easily modify, add, or convert each constituent in the above embodiments within the scope of this invention.

A part of the configuration of one embodiment may be replaced with the one of another embodiment; and the configuration of one embodiment may be added to another embodiment. A part of the configuration of each embodiment may be added, deleted, or replaced by a different configuration.

The above-described configurations, functions, processors, and means for processing, for all or a part of them, may be implemented by hardware: for example, by designing integrated circuits. The information of programs, tables, and files to implement the functions may be stored in a storage device such as a non-volatile semiconductor memory, a hard disk drive, or an SSD (Solid State Drive), or a computer-readable non-transitory data storage medium such as an IC card, an SD card, or a DVD.

The invention claimed is:

1. A storage system comprising:
a virtual volume to which real storage areas are allocated depending on data amount to be stored therein and which stores a plurality of mainframe data managed in units of tracks, each of the plurality of mainframe data including control information and one or more records storing user data; and
a controller, wherein:
the virtual volume is managed by a first real storage area storing the records in the plurality of mainframe data and a second real storage area storing the control information in the plurality of mainframe data;
the controller determines not to allocate the first real storage area to the virtual volume in a case that user data in the records in the plurality of mainframe data are initial values; and
the control information in the plurality of mainframe data is stored in the second real storage area allocated to the virtual volume.

2. The storage system according to claim 1, wherein:
requirements for the determination by the controller include that, in each of the plurality of mainframe data, record lengths of the one or more records are the same fixed length; and
each piece of the control information includes information on record lengths of the one or more records corresponding thereto.

3. The storage system according to claim 2, wherein:
each of the one or more records includes record control data; and
the controller deallocates the first real storage area which has been allocated to the virtual volume and holds record control data from the virtual volume in accordance with the determination.

4. The storage system according to claim 3, wherein the controller makes the determination and deallocates the first real storage area after writing the record control data to the first real storage area in response to a format write command from a host.

5. The storage system according to claim 4, wherein the controller makes the determination after creating a last record in the first real storage area.

6. The storage system according to claim 1, wherein the controller keeps the first real storage area unallocated to the virtual volume in accordance with the determination.

7. The storage system according to claim 1, wherein the controller refers to the second storage area to allocate the first real storage area to the virtual volume in response to a write of user data to one of the records in the plurality of mainframe data.

8. The storage system according to claim 2, wherein the requirements for the determination by the controller include that record lengths of all records in the plurality of mainframe data are the same fixed length.

9. The storage system according to claim 1, wherein, in response to a read access from a host to the first real storage area unallocated to the virtual volume, the controller transmits initial values to the host while keeping the first real storage area unallocated.

10. The storage system according to claim 1, wherein, after creation of records by formatting the first real storage area, the controller makes the determination on the first real storage area which has been allocated to the virtual volume in response to a predetermined event.

11. The storage system according to claim 10, wherein the predetermined event is a predetermined command from a host.

12. The storage system according to claim 1, wherein records to be stored by the first real storage area are records copied from a logical volume whose capacity is the same as capacity of real storage areas allocated thereto.

13. The storage system according to claim 12, wherein:
the logical volume is held in a first storage subsystem;
the virtual volume is held in a second storage subsystem coupled to the first storage subsystem; and
the first storage subsystem omits to transmit the records to be stored in the first real storage area to the second storage subsystem.

14. The storage system according to claim 1, wherein, in copying data in the virtual volume to a logical volume whose capacity is the same as capacity of real storage areas allocated thereto, the one or more records whose user data are initial values are created in the logical volume.

15. A method of controlling a storage system comprising:
providing a virtual volume to which real storage areas are allocated depending on data amount to be stored therein and which stores a plurality of mainframe data managed in units of tracks, each of the plurality of mainframe data including control information and one or more records storing user data;

determining, in a case that user data in the records in the plurality of mainframe data are initial values, not to allocate a first real storage area for storing the records to the virtual volume;

storing the control information in the plurality of mainframe data in a second real storage area; and referring to the second storage area to allocate the first real storage area to the virtual volume in response to a write of user data to one of the records in the plurality of mainframe data.

* * * * *